United States Patent
Satoyama et al.

(10) Patent No.: US 9,823,955 B2
(45) Date of Patent: Nov. 21, 2017

(54) STORAGE SYSTEM WHICH IS CAPABLE OF PROCESSING FILE ACCESS REQUESTS AND BLOCK ACCESS REQUESTS, AND WHICH CAN MANAGE FAILURES IN A AND STORAGE SYSTEM FAILURE MANAGEMENT METHOD HAVING A CLUSTER CONFIGURATION

(71) Applicant: Hitachi, Ltd., Tokyo (JP)

(72) Inventors: Ai Satoyama, Tokyo (JP); Yoshiaki Eguchi, Tokyo (JP); Yusuke Nonaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 14/762,850

(22) PCT Filed: Apr. 23, 2013

(86) PCT No.: PCT/JP2013/061928
§ 371 (c)(1),
(2) Date: Jul. 23, 2015

(87) PCT Pub. No.: WO2014/174594
PCT Pub. Date: Oct. 30, 2014

(65) Prior Publication Data
US 2015/0363254 A1    Dec. 17, 2015

(51) Int. Cl.
*G06F 11/00* (2006.01)
*G06F 11/07* (2006.01)
(Continued)

(52) U.S. Cl.
CPC ........ *G06F 11/0772* (2013.01); *G06F 11/073* (2013.01); *G06F 11/0727* (2013.01);
(Continued)

(58) Field of Classification Search
CPC .............. G06F 11/0709; G06F 11/712; G06F 11/0727; G06F 11/2046; G06F 11/2053;
(Continued)

(56) References Cited

U.S. PATENT DOCUMENTS

| | | | | |
|---|---|---|---|---|
| 6,360,331 B2 * | 3/2002 | Vert | ..................... | G06F 11/1662 709/239 |
| 6,438,705 B1 * | 8/2002 | Chao | ................... | G06F 11/1425 709/226 |

(Continued)

FOREIGN PATENT DOCUMENTS

| | | |
|---|---|---|
| JP | 2003-67137 A | 3/2003 |
| JP | 2005-128733 A | 5/2005 |

(Continued)

OTHER PUBLICATIONS

International Search Report of PCT/JP2013/061928.

*Primary Examiner* — Gabriel Chu
(74) *Attorney, Agent, or Firm* — Mattingly & Malur, PC

(57) ABSTRACT

Failures in a storage system are managed at low cost and with high reliability. A storage system is coupled to a file command issuing apparatus and a block command issuing apparatus, and processes commands from both. The storage system is provided with: a first control portion which is provided extending across a plurality of clusters and which is configured to control block access requests to a disk device; a plurality of second control portions which are configured to process file access requests and provided respectively in the clusters, and operate on virtual machines managed by a virtualization control portion; failure detecting portions which are configured to detect failures within each of the clusters; and a failure information management portion which is provided in the first control portion and which is configured to consolidate and manage failure information relating to failures detected by the failure detecting portions.

9 Claims, 22 Drawing Sheets

(51) Int. Cl.
*G06F 11/20* (2006.01)
*G06F 11/14* (2006.01)

(52) U.S. Cl.
CPC ...... *G06F 11/0751* (2013.01); *G06F 11/0784* (2013.01); *G06F 11/2094* (2013.01); *G06F 11/1484* (2013.01)

(58) Field of Classification Search
CPC ............. G06F 11/2089; G06F 11/3006; G06F 11/301; G06F 11/3034; G06F 11/3048; G06F 9/5077; G06F 11/0766; G06F 11/0772; G06F 11/0784; G06F 11/079; G06F 11/0793; G06F 11/2023
See application file for complete search history.

(56) References Cited

U.S. PATENT DOCUMENTS

| | | | |
|---|---|---|---|
| 7,840,790 B1 | 11/2010 | Sekhar et al. | |
| 8,166,211 B2 | 4/2012 | Cota-Robles et al. | |
| 8,185,776 B1 * | 5/2012 | Gentes | G06F 11/1438 709/223 |
| 2005/0018709 A1 | 1/2005 | Barrow et al. | |
| 2005/0091453 A1 | 4/2005 | Shimada et al. | |
| 2005/0091454 A1 | 4/2005 | Shimada et al. | |
| 2007/0168559 A1 * | 7/2007 | Tanaka | G06F 3/0614 709/246 |
| 2007/0220376 A1 * | 9/2007 | Furukawa | G06F 11/0727 714/57 |
| 2008/0250267 A1 * | 10/2008 | Brown | G06F 11/1482 714/4.1 |
| 2009/0125751 A1 | 5/2009 | Dawson et al. | |
| 2012/0102135 A1 * | 4/2012 | Srinivasan | G06F 9/45558 709/213 |
| 2013/0290771 A1 | 10/2013 | Kim et al. | |
| 2014/0059392 A1 * | 2/2014 | Ren | G06F 11/301 714/47.1 |

FOREIGN PATENT DOCUMENTS

| | | |
|---|---|---|
| JP | 2008-217728 A | 9/2008 |
| WO | WO 2012/063294 A1 | 5/2012 |

* cited by examiner

【Fig. 1】
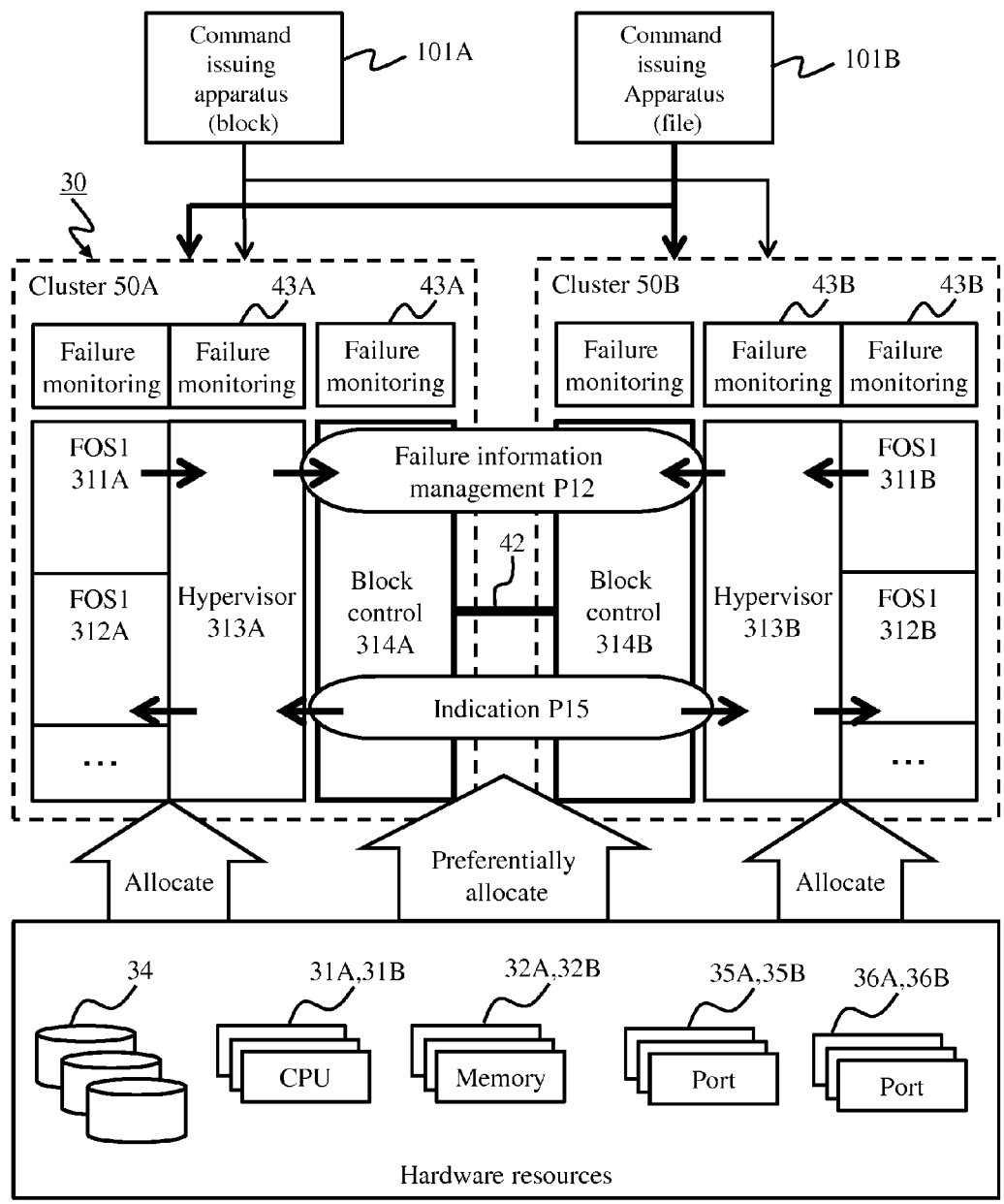

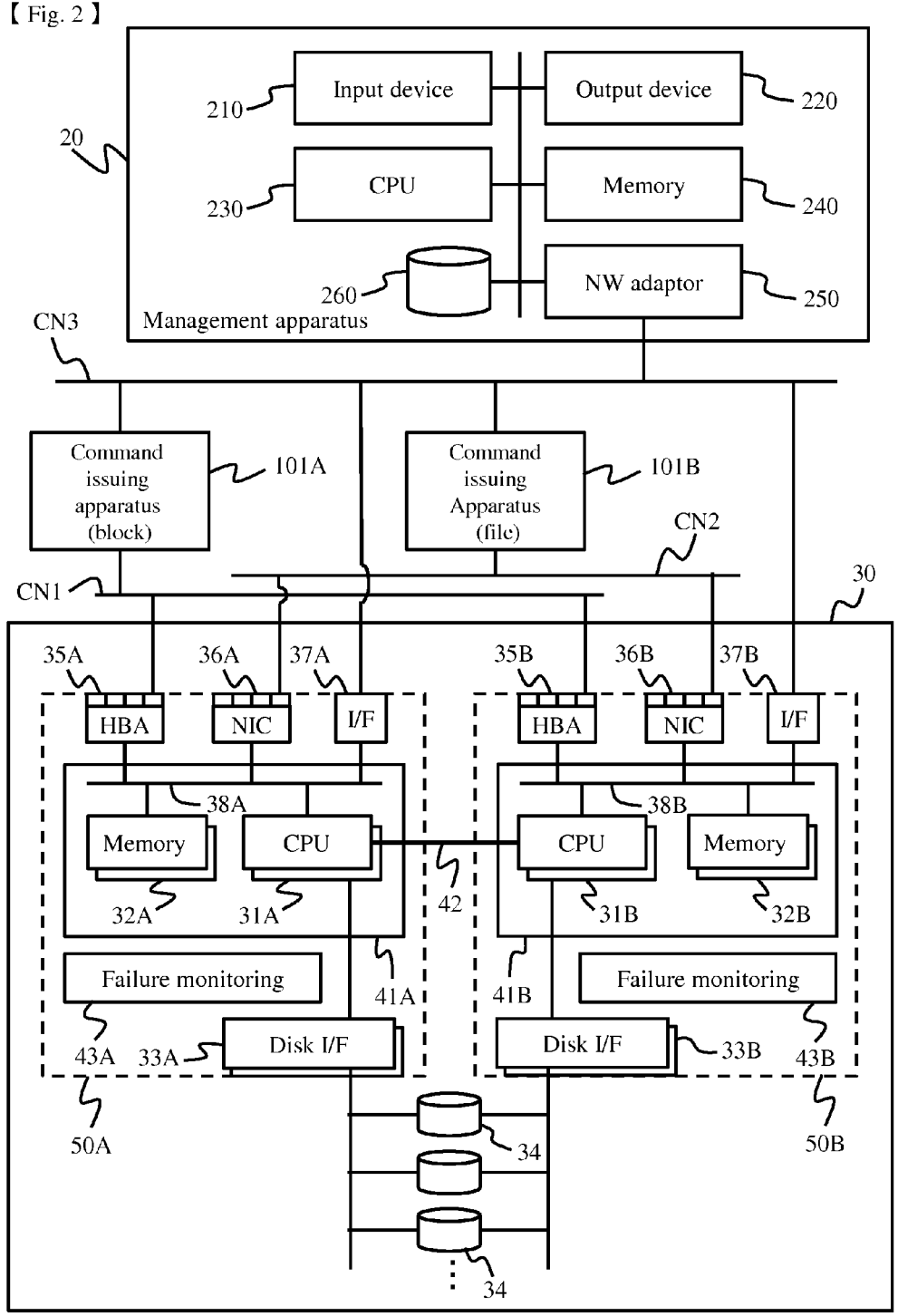
[Fig. 2]

[Fig. 3]
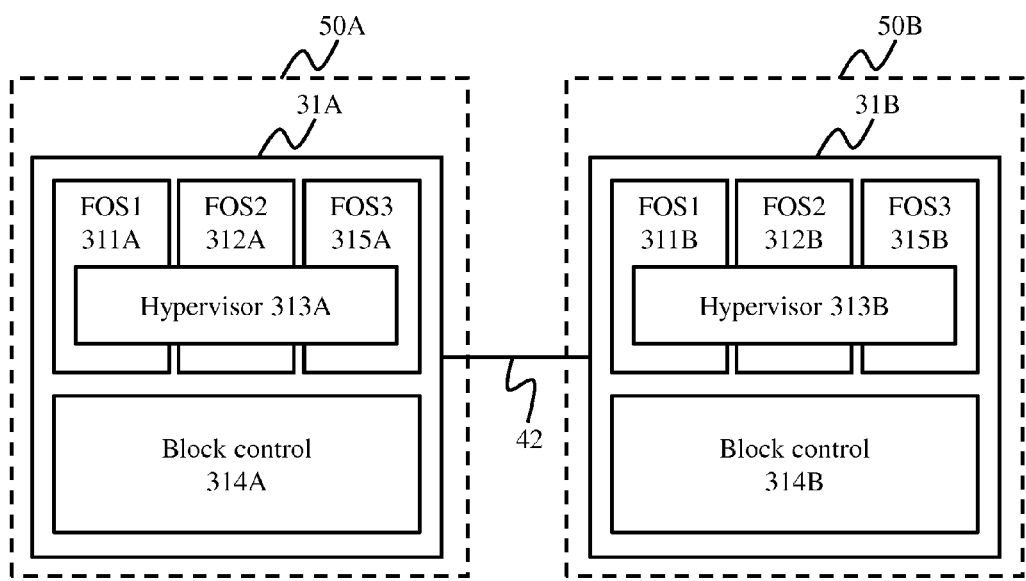

【Fig. 4】
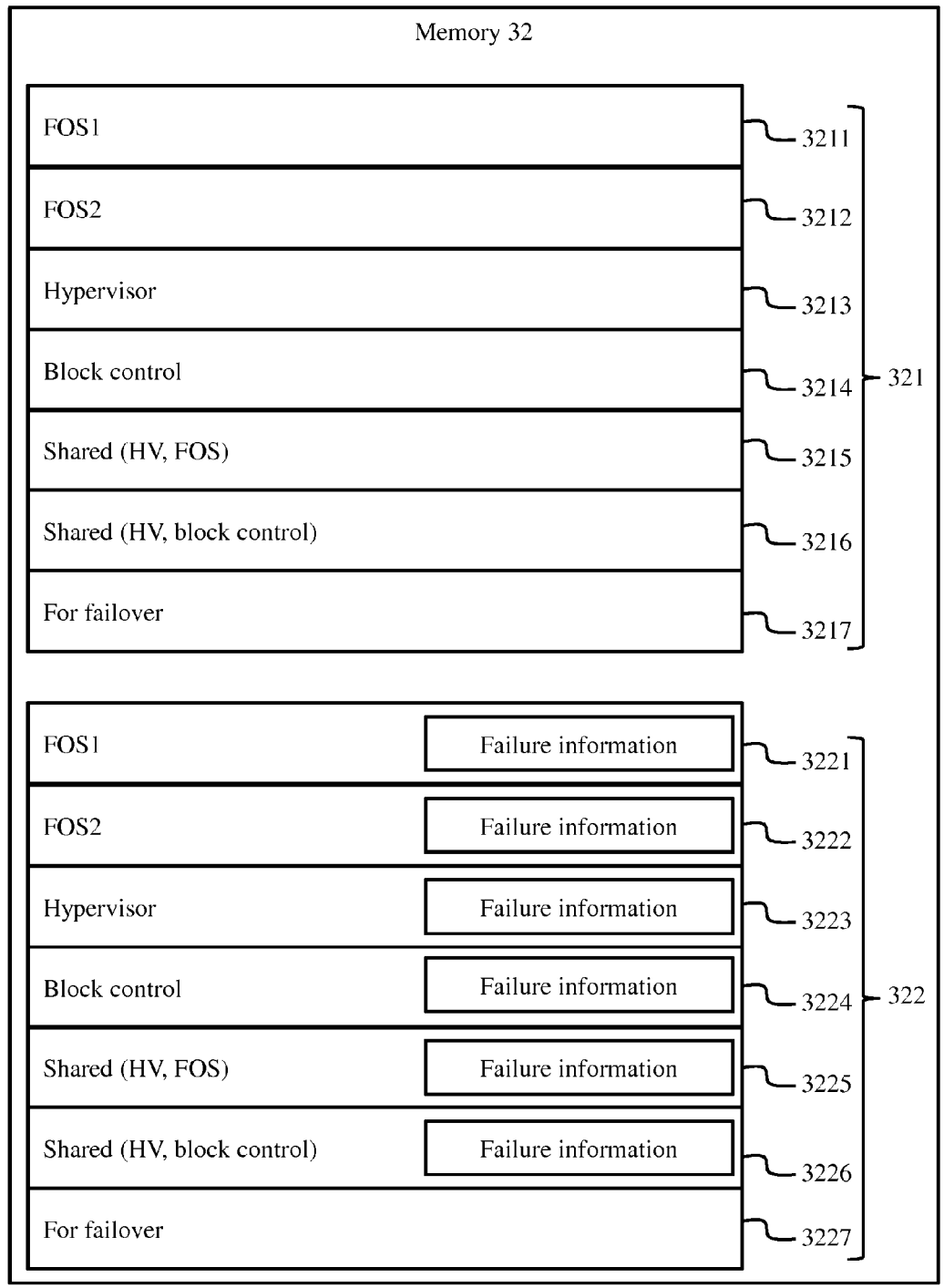

[Fig. 5]
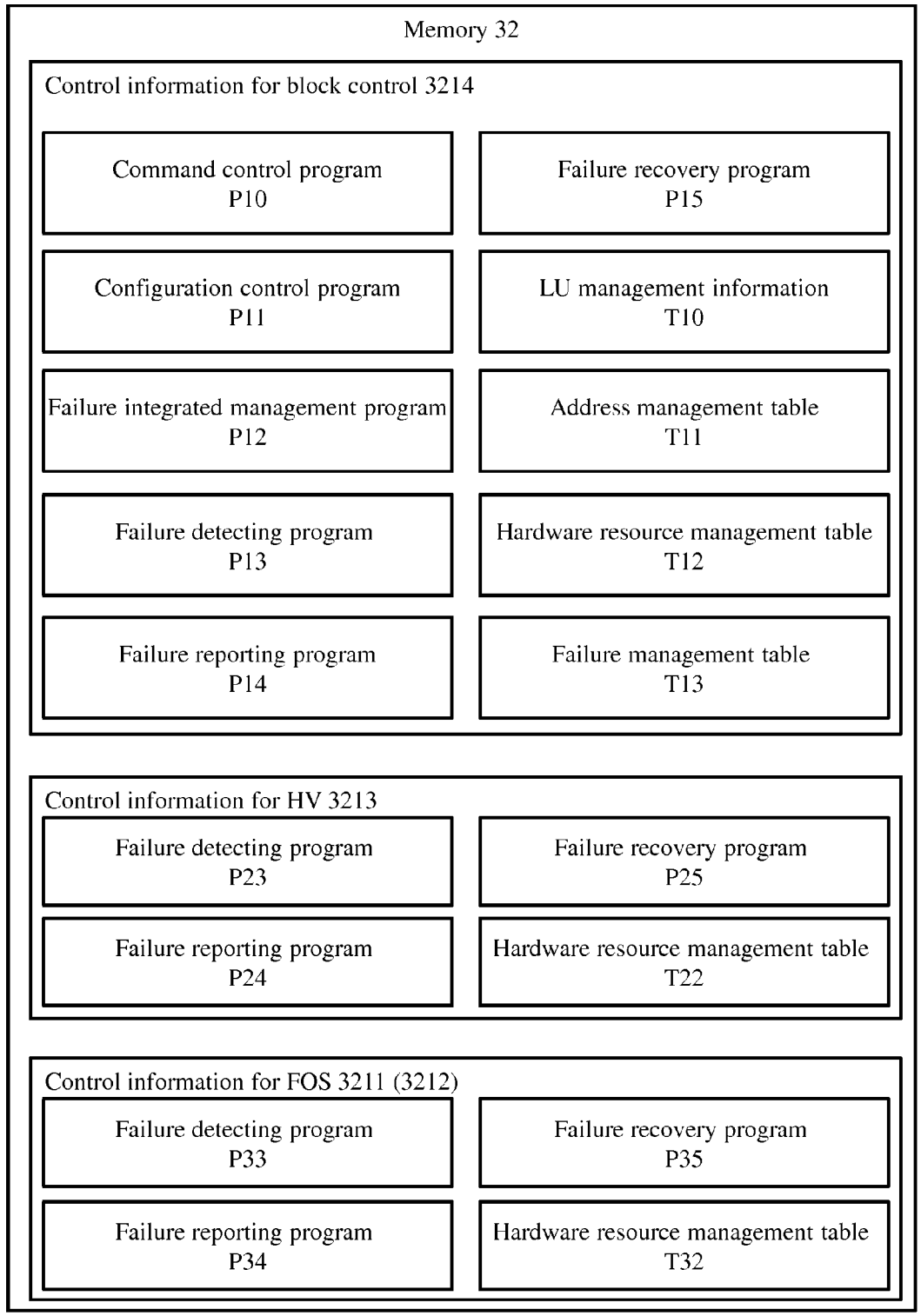

[Fig. 6]
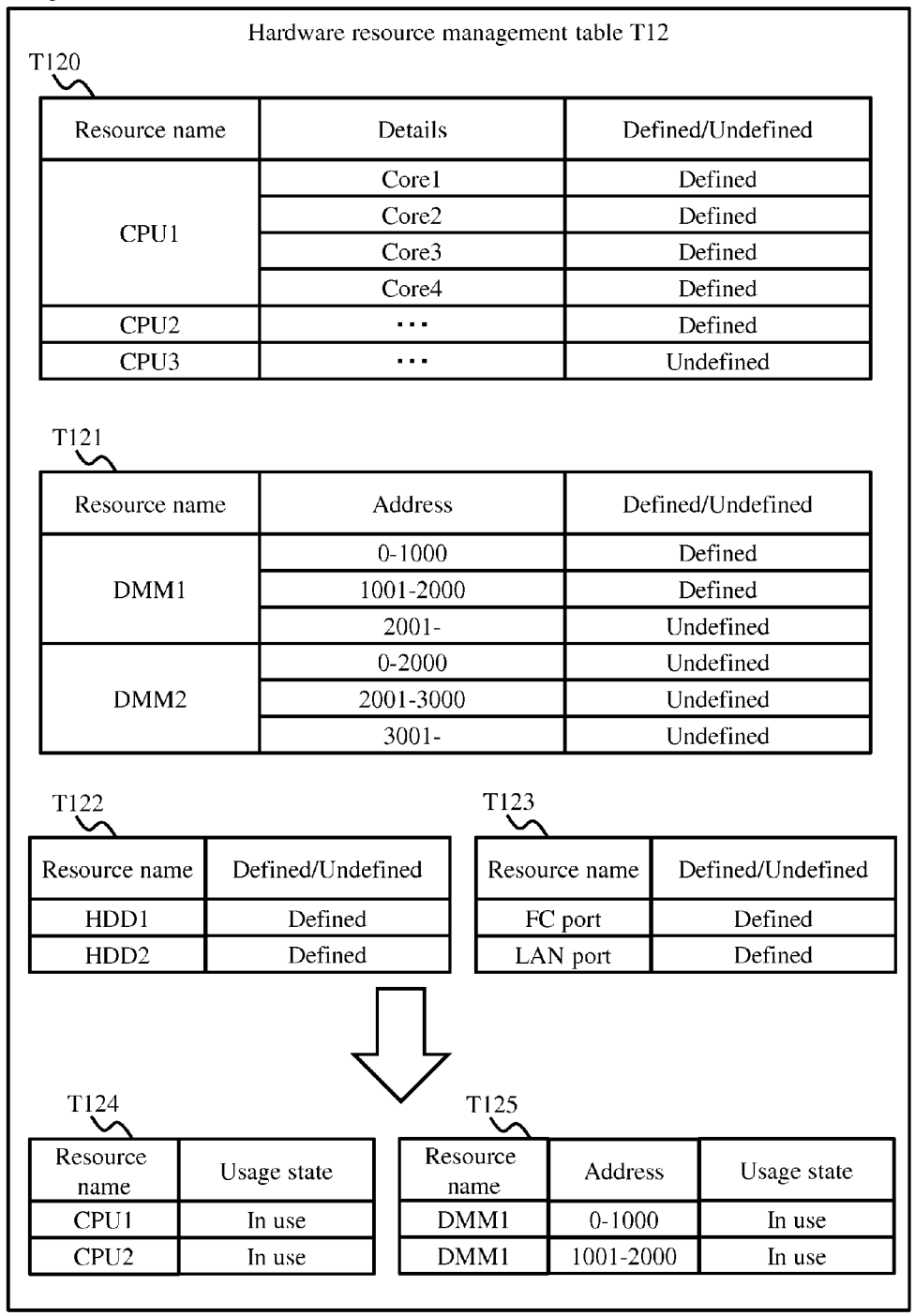

【Fig. 7】

Hardware resource management table T22

T220

| Resource name | Usage state |
|---|---|
| CPU3 | In use |
| CPU4 | In use |

T221

| Resource name | Address | Usage state | User |
|---|---|---|---|
| Memory | 1001-2000 | In use | Hypervisor |
| | 2001-3000 | In use | Hypervisor |
| | 3001-4000 | In use | FOS1 |
| | 4001-5000 | In use | FOS2 |
| | ... | In use | FOS3 |

T222

| Resource name | Virtual resource name | User |
|---|---|---|
| CPU3 | VCPU1 | FOS1 |
| | VCPU2 | FOS2 |
| | VCPU3 | FOS1 |
| | VCPU4 | FOS1 |
| CPU4 | | |

【Fig. 8】

Hardware resource management table T32

T320

| Resource name |
|---|
| CPU3 |

T321

| Resource name | Address | Usage state |
|---|---|---|
| Memory | 1001-2000 | In use |
| | 2001-3000 | In use |

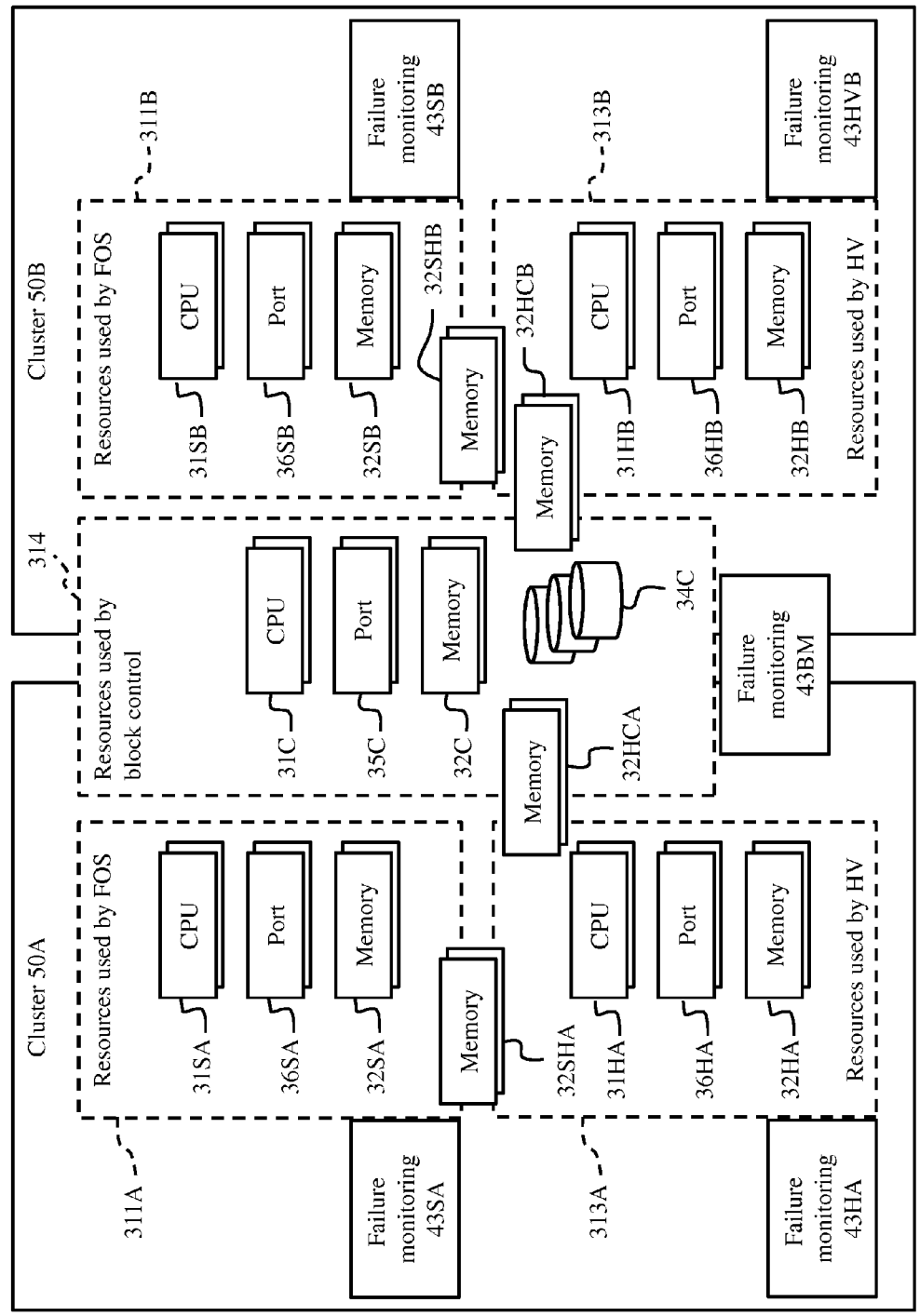

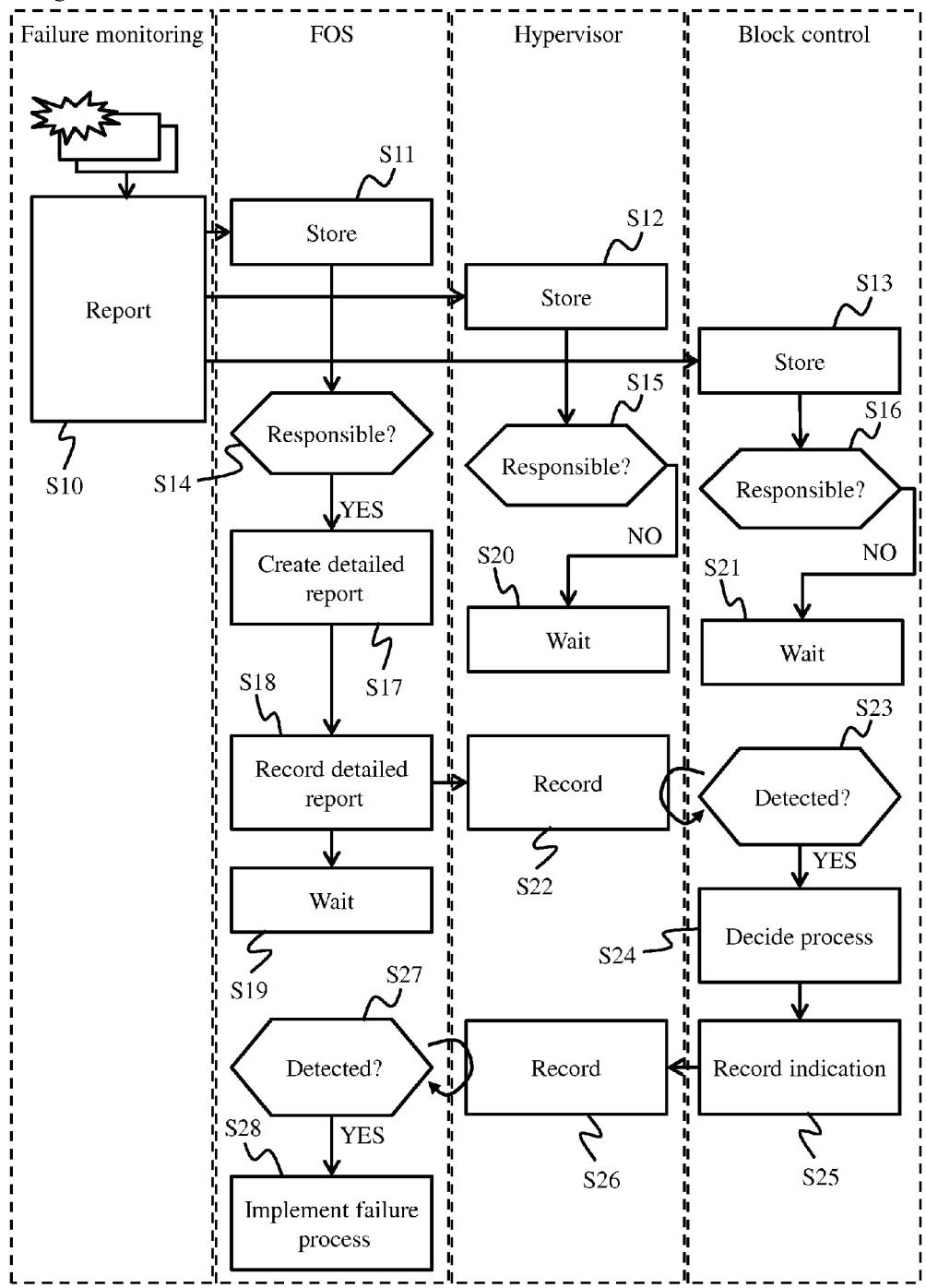

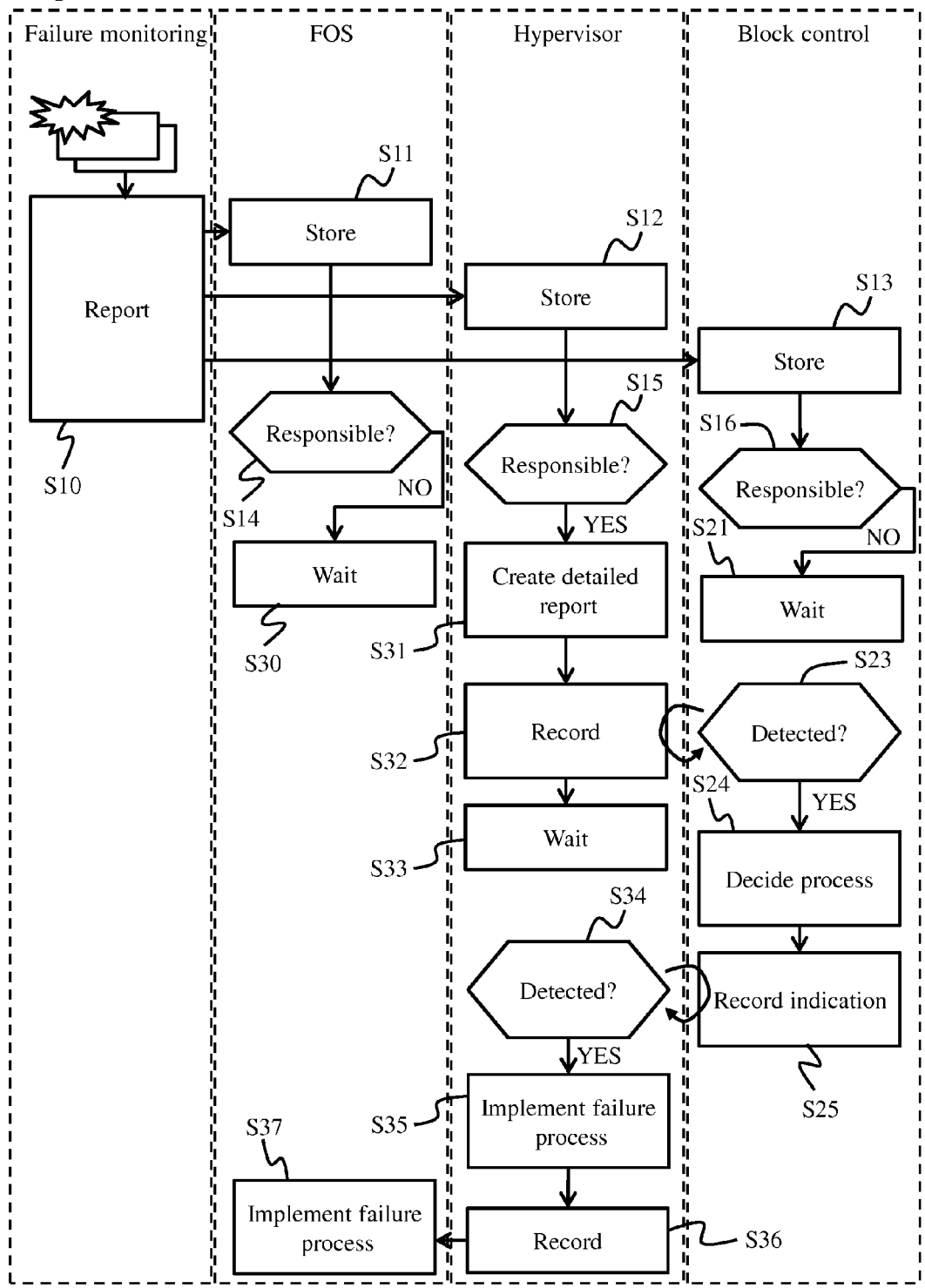

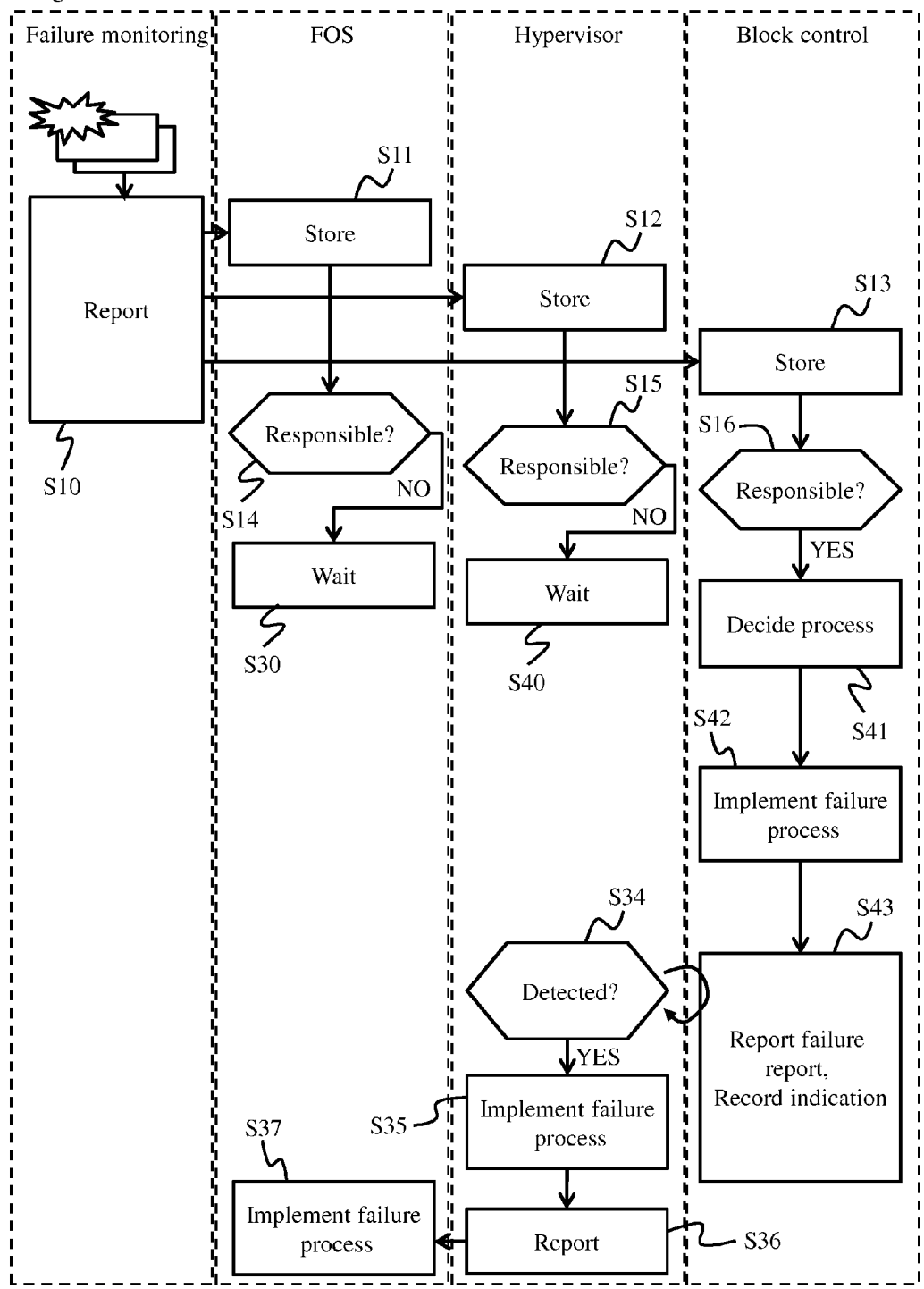

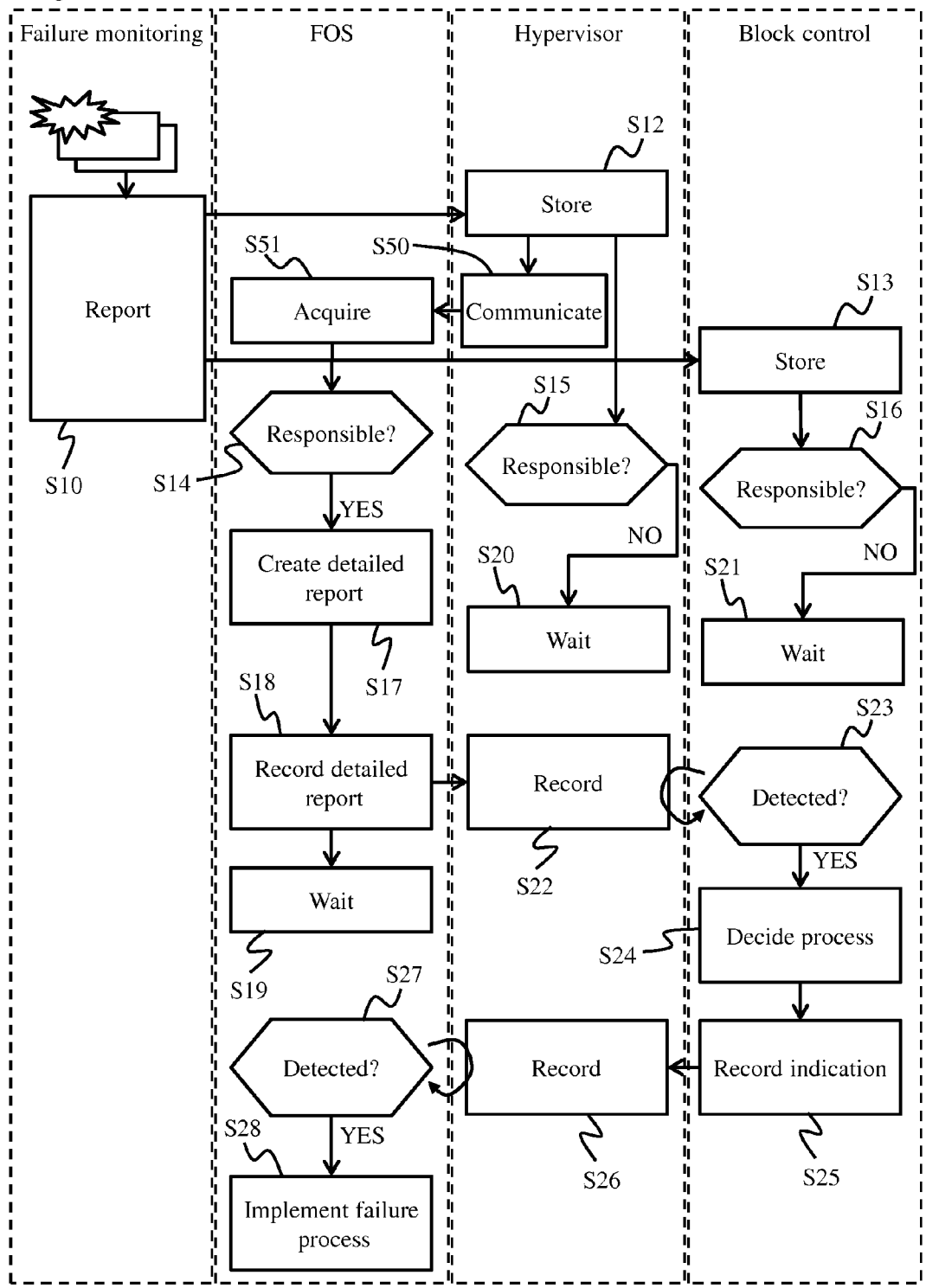
[Fig. 13]

[Fig. 14]

Failure management table T13

T130

| Resource name | State | User |
|---|---|---|
| CPU1 | Normal | Block control |
| CPU2 | In use | Block control |
| CPU3 | In use | FOS1 |
| CPU4 | In use | FOS2 |

T131

| Resource name | State | Address | User |
|---|---|---|---|
| Memory | Normal | 0-1000 | Block control |
| | | 1001-2000 | Shared |
| | | 2001-3000 | Hypervisor |
| | | 3001-4000 | FOS1 |
| | | 4001-5000 | FOS2 |
| | | ... | FOS1 |

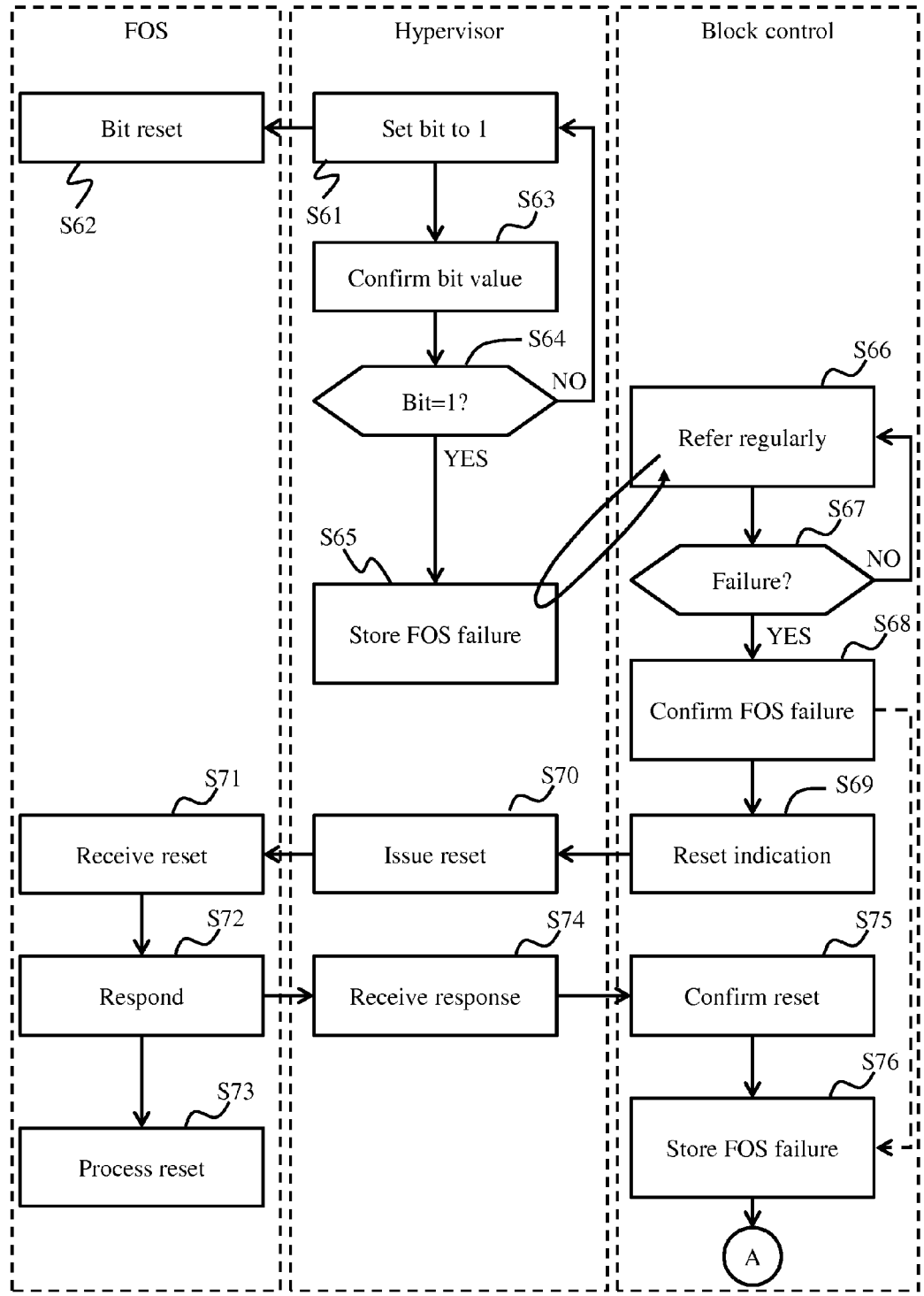

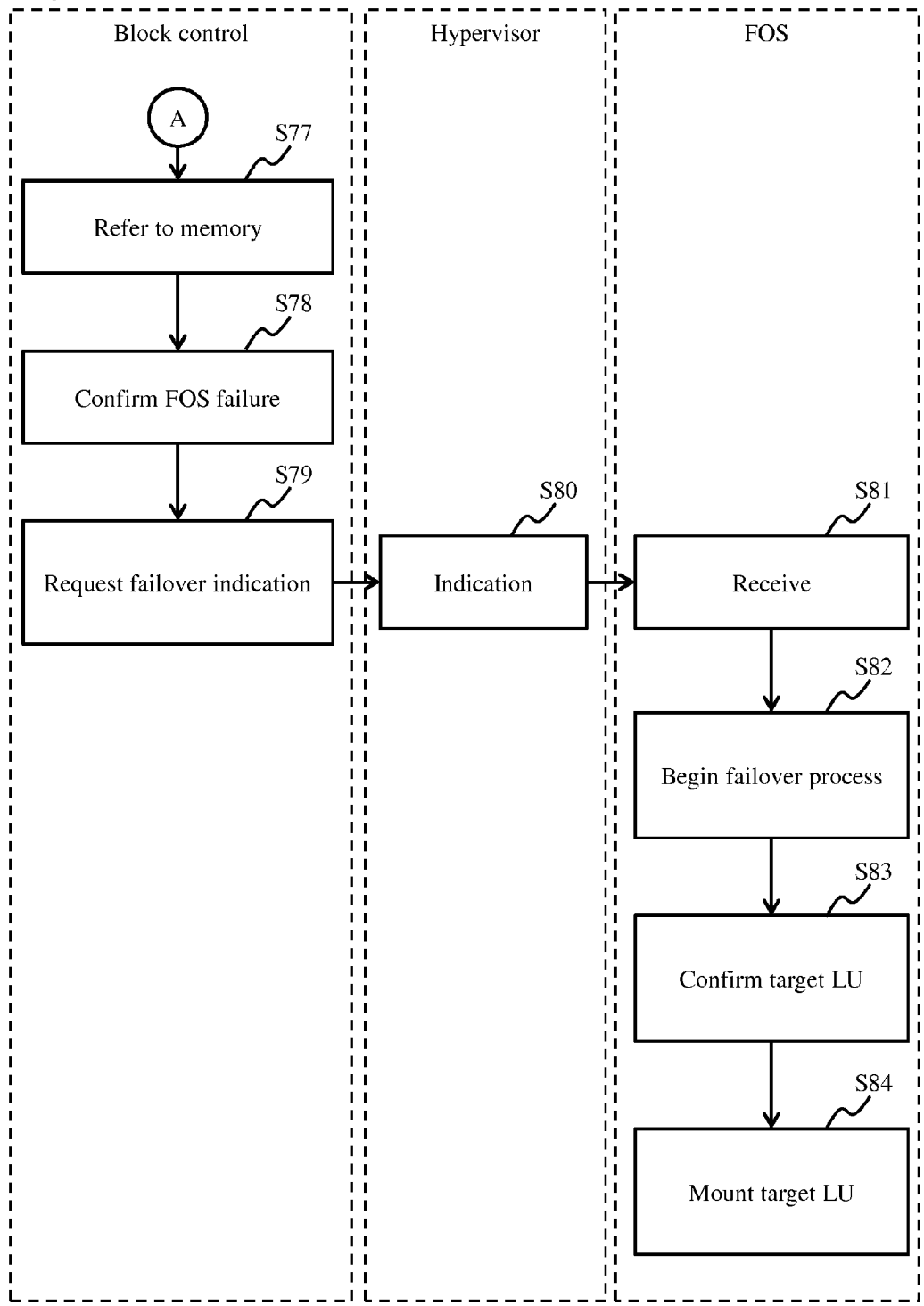
[Fig. 16]

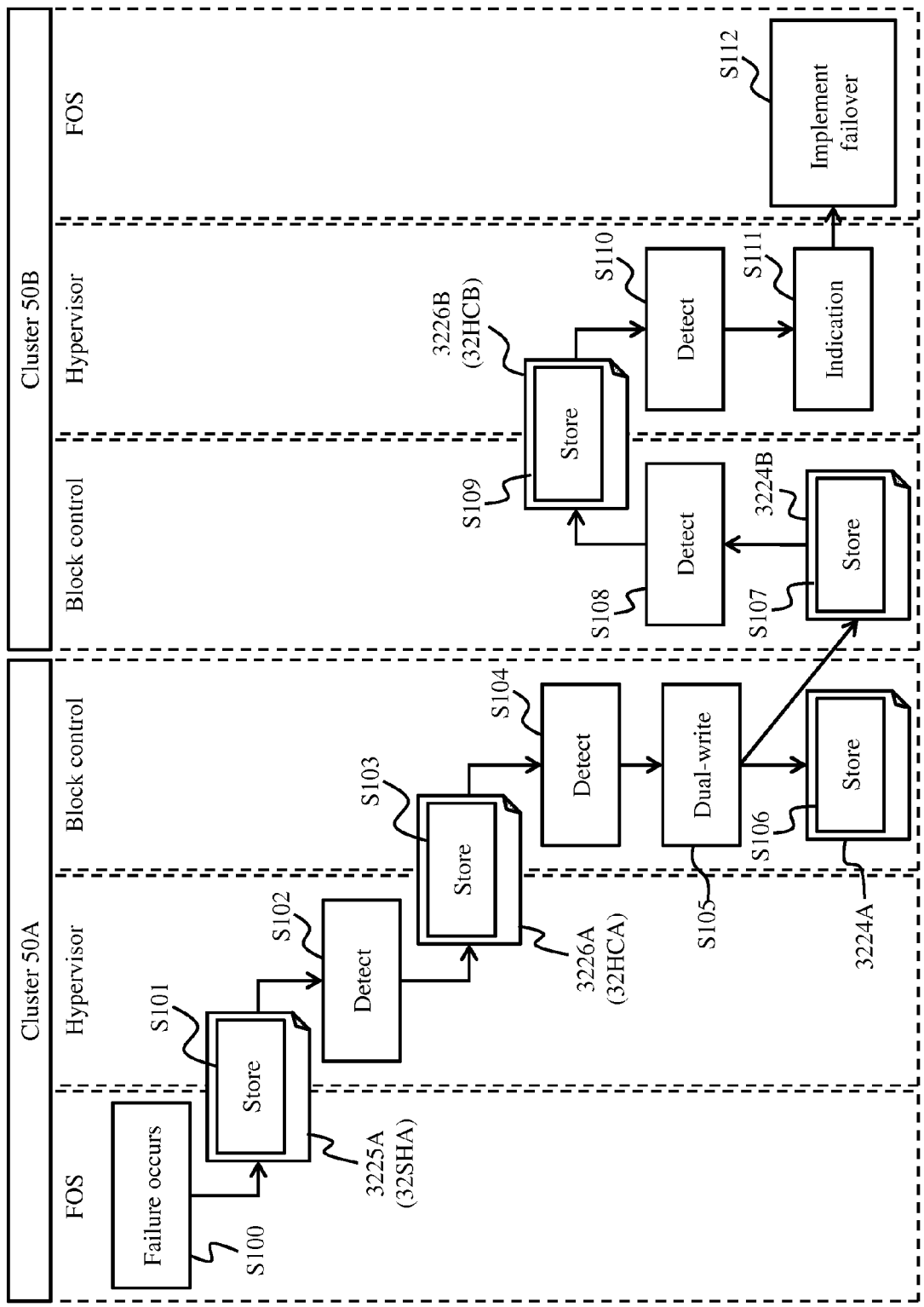
[Fig. 17]

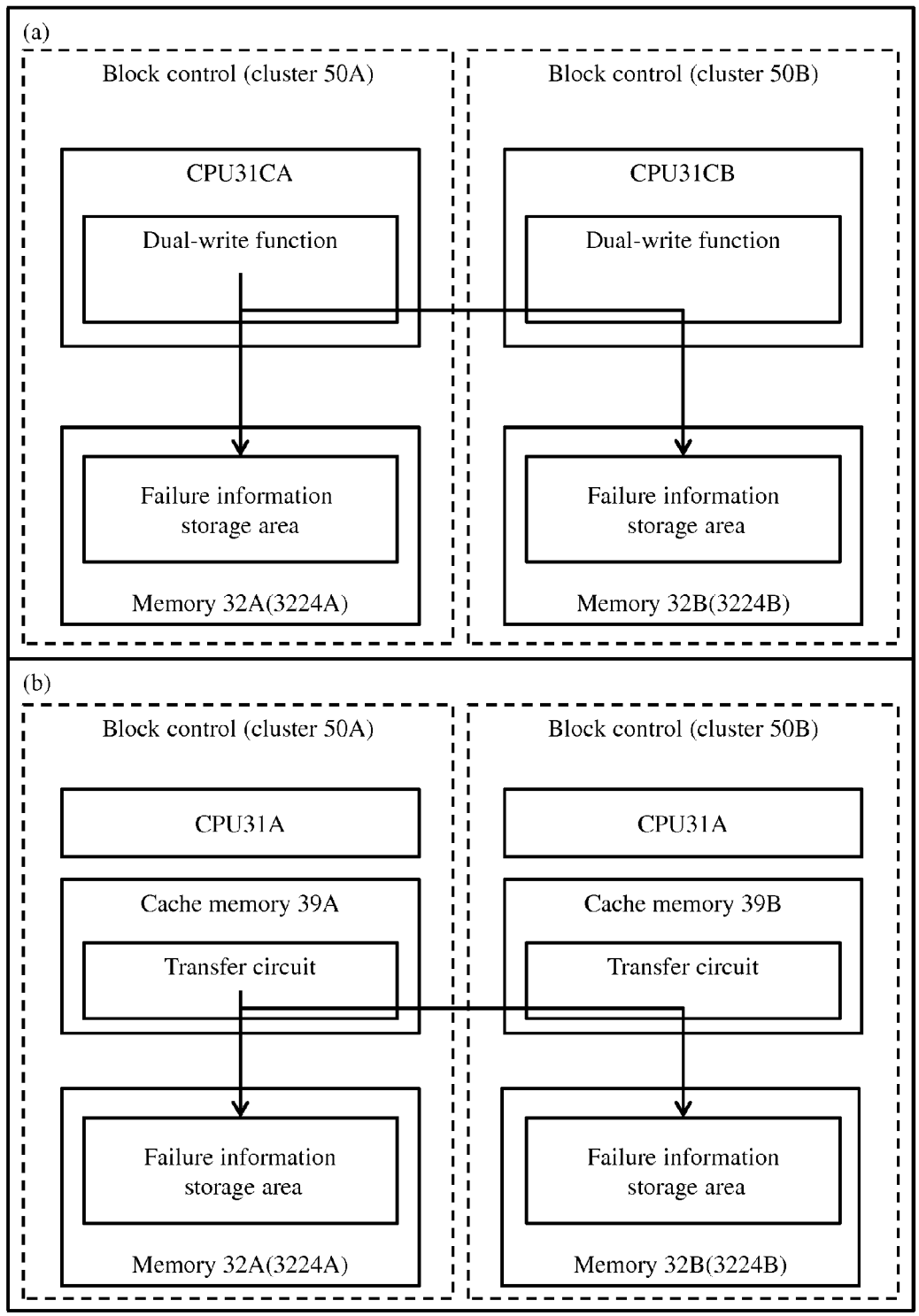

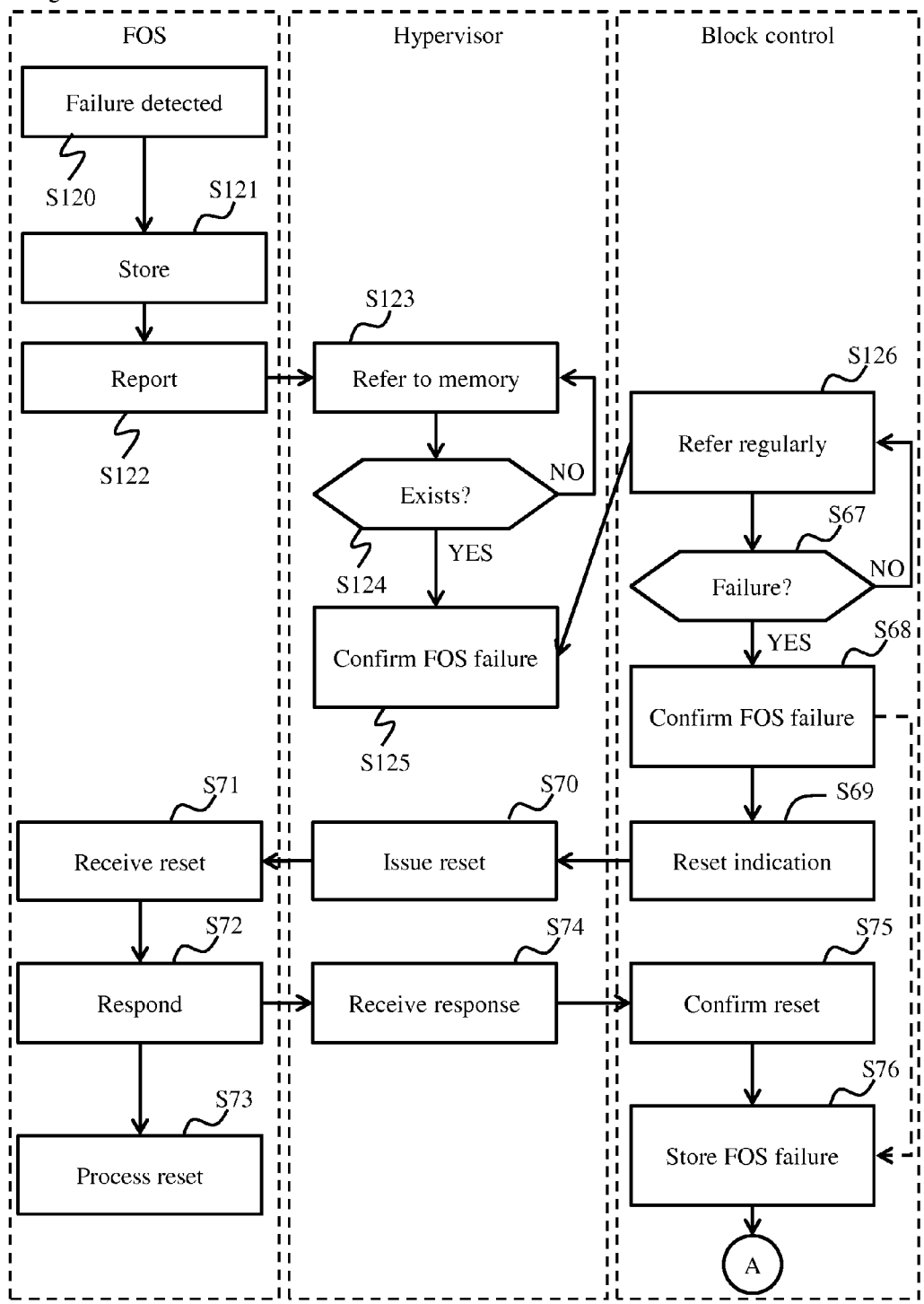

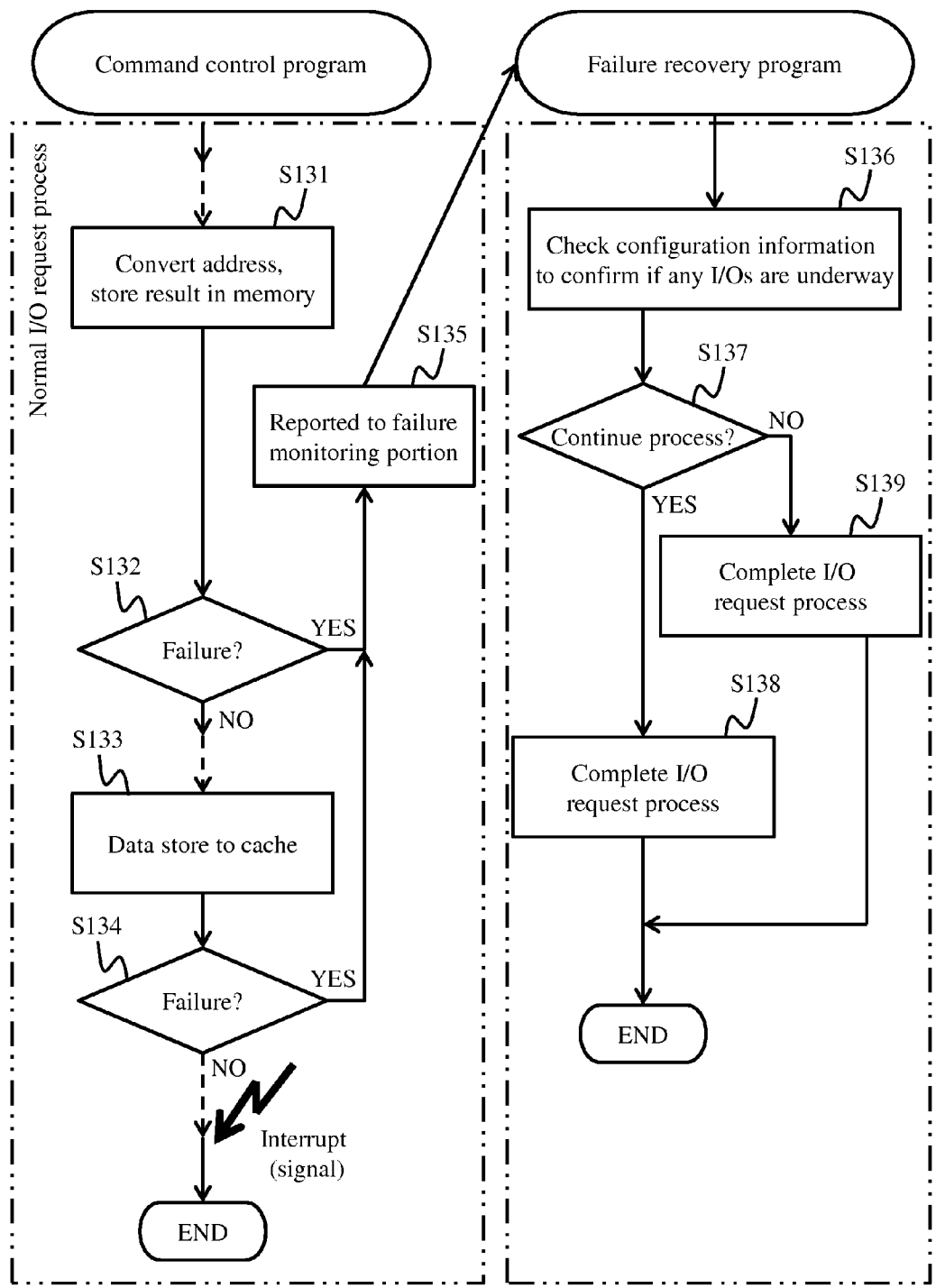

[Fig. 21]

[Fig. 22]
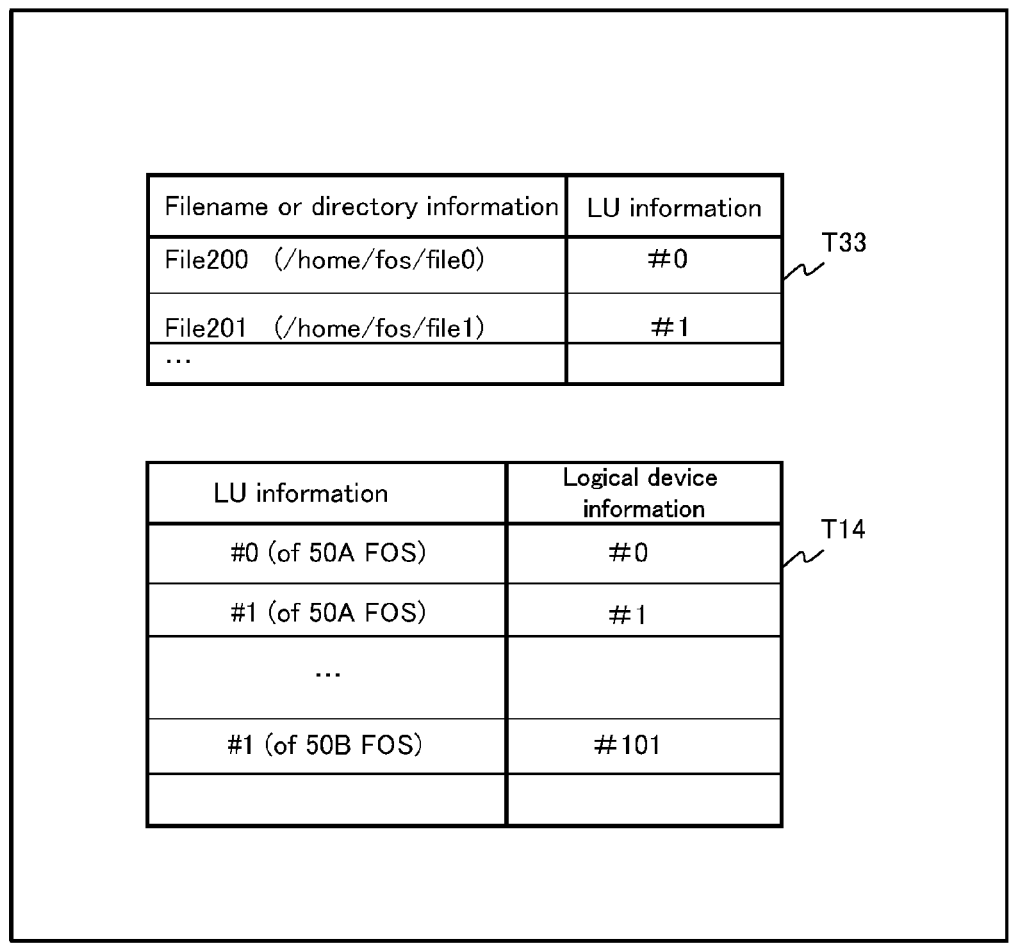

STORAGE SYSTEM WHICH IS CAPABLE OF PROCESSING FILE ACCESS REQUESTS AND BLOCK ACCESS REQUESTS, AND WHICH CAN MANAGE FAILURES IN A AND STORAGE SYSTEM FAILURE MANAGEMENT METHOD HAVING A CLUSTER CONFIGURATION

TECHNICAL FIELD

The present invention relates to a storage system and a storage system failure management method.

BACKGROUND ART

With known virtualization technology, a plurality of virtual machines (virtual computers) is provided in a single physical computer, and mutually different operating systems (OS) can be executed on each virtual machine. Dedicated virtualization software is required to implement a virtual machine.

Such dedicated virtualization software includes software whereby a hardware resource having a storage apparatus such as a NAS (Network Attached Storage) is divided logically, forming a plurality of logical partitions (virtual storage apparatuses), and these logical partitions are operated independently (PTL 1). It should be noted that examples of technology relating to the virtual machine environment can be found in PTL 2 and 3.

With a file system, failover of the entire NAS is executed immediately even if for example only one part of the hardware (ports, memory or the like) in the NAS fails. In contrast, key business operations in banks, stock brokerage firms and the like employ block microcontrol, in which block access to a storage apparatus is performed using a SAN (Storage Area Network), and thus high reliability is achieved. A fallback operation is implemented in storage systems which execute block microcontrol, whereby if a failure occurs in part of the hardware the hardware in which the failure has occurred is disconnected from the system and operation continues. Thus shut-down of the entire storage system due to failure of one part thereof is prevented as far as possible in storage systems in which block microcontrol is executed.

CITATION LIST

Patent Literature

[PTL 1]
US2005/0091454A1
[PTL 2]
U.S. Pat. No. 7,840,790
[PTL 3]
U.S. Pat. No. 8,166,211

SUMMARY OF INVENTION

Technical Problem

There has been a focus in recent years on integrated storage systems in which a plurality of protocols, such as FC (Fibre channel), iSCSI (Internet Small Computer System Interface), FCoE (Fibre Channel over Ethernet (registered trademark)), NAS and the like can be handled using a single machine. Such integrated storage systems are referred to as unified storage systems, and they have advantages in that for example space can be saved, cost reduced and operability improved.

In order to increase availability it is conceivable to use unified storage systems in a cluster configuration. In this case, a management apparatus known as a Quorum disk is provided externally to the unified storage system, and the condition of each cluster is managed by this management apparatus. If the management apparatus detects the occurrence of a failure within any cluster it issues a reset indication to the element in which the failure occurred, and issues a failover indication to a failover destination.

However, if a coupling cable between the management apparatus and the unified storage system becomes loose or breaks, a so-called split-brain state results, and the management apparatus becomes unable to judge whether the target of monitoring is dead or alive. Therefore, in this case the management apparatus is unable to detect failures occurring in any of the clusters in the unified storage system.

Further, in a unified storage system the frequency with which failures occur in the file system is considered to be high, but if a failover process is executed for each minor failure the performance of the unified storage system deteriorates and ease of use for the user is poor.

The present invention takes account of the abovementioned problems, and its object is to provide a storage system which is capable of processing file access requests and block access requests, and which can manage failures in a storage system having a cluster configuration. Another object of the present invention is to provide a storage system and a storage system failure management method in which a first control portion which processes block access requests also consolidates and manages failures in a plurality of second control portions which process file access requests, thereby allowing failures in a storage system having a cluster configuration to be managed without using a special external apparatus.

Solution to Problem

In order to resolve the problems, the storage system according to the present invention is a storage system configured to process file access requests and block access requests, provided with: a plurality of clusters, a first control portion which is provided extending across the clusters and which is configured to control block access requests to a disk device; a plurality of second control portions which are configured to process file access requests, and which are provided respectively in the clusters, and operate on virtual machines managed by a virtualization control portion; failure detecting portions which are provided respectively within the clusters and which are configured to detect failures within each of the clusters, and a failure information management portion which is provided in the first control portion and which is configured to consolidate and manage failure information relating to failures detected by the failure detecting portions.

A failure recovery portion may also be provided within the first control portion, and the failure recovery portion may be configured to decide upon the processing content for processing of failures managed by the failure information management portion and to indicate to the control portion responsible for the location in which the failure occurred, from among the first control portion, the second control portion and the virtualization control portion, that it should execute the processing content that has been decided upon.

DESCRIPTION OF DRAWINGS

FIG. 1 is an explanatory view illustrating in outline an embodiment of the present invention.

FIG. 2 is a block diagram illustrating the storage system hardware configuration.

FIG. 3 is an explanatory view illustrating the controller software configuration.

FIG. 4 is an explanatory view illustrating contents stored in the memory.

FIG. 5 is an explanatory view illustrating an area within the memory in which control information is stored.

FIG. 6 is an explanatory view illustrating a configuration example of a table used to manage hardware resources used by a block control portion.

FIG. 7 is an explanatory view illustrating a configuration example of a table used to manage hardware resources used by a hypervisor.

FIG. 8 is an explanatory view illustrating a configuration example of a table used to manage hardware resources used by an FOS (OS used by a file system) other than the block control portion.

FIG. 9 is an explanatory view illustrating the relationship between hardware resources retained respectively by the block control portion, the hypervisor and the FOS.

FIG. 10 is a flowchart illustrating a process performed when a failure occurs in a hardware resource allocated to the FOS.

FIG. 11 is a flowchart illustrating a process performed when a failure occurs in a hardware resource allocated to the hypervisor.

FIG. 12 is a flowchart illustrating a process performed when a failure occurs in a hardware resource allocated to the block control portion.

FIG. 13 is a flowchart illustrating another example of a process performed when a failure occurs in a hardware resource allocated to the FOS.

FIG. 14 is an explanatory view illustrating a configuration example of a table used to manage failures.

FIG. 15 is a flowchart illustrating a process in which shut-down of an FOS is detected and failover begins.

FIG. 16 is a flowchart which is a continuation of FIG. 15.

FIG. 17 is a flowchart illustrating the operation of the block control portion from failure detection until execution of the failover process.

FIG. 18 is an explanatory view illustrating a method of transmitting failure information between a pair of block control portions extending across clusters.

FIG. 19 relates to a second embodiment, and is a flowchart illustrating a process in which an FOS detects a failure of itself and sends a report to a block control portion.

FIG. 20 relates to a third embodiment, and is a flowchart illustrating a processing method for a case in which a failure occurs during an I/O (Input/Output) process.

FIG. 21 is an explanatory view illustrating an example of failover configuration information.

FIG. 22 illustrates a configuration example of information (T33) used to manage the relationship between a file (file system) name or directory information specified at the time of an I/O request and a target volume, and a configuration example of information (T14) used to manage the relationship between LU information specified by a user and an LU number managed by an FOS.

DESCRIPTION OF EMBODIMENTS

Embodiment of the present invention will now be described with reference to the drawings. In the accompanying drawings, elements that are functionally the same are in some cases indicated using the same reference number. The accompanying drawings illustrate specific embodiments and examples conforming to the principles of the present invention. These embodiments and examples are intended to aid understanding of the present invention, and must not be used to interpret the present invention in a restrictive manner.

In the present embodiments, the present invention is described sufficiently and in detail so as to allow it to be implemented by one skilled in the art, but other embodiments are also possible. It should be understood that modifications to the configuration or construction and replacement of various elements are possible without deviating from the scope and spirit of the technical idea of the present invention. Therefore the following description must not be interpreted as being restrictive.

Further, as discussed hereinbelow the embodiments of the present invention may be implemented using software running on a general-purpose computer, or may be implemented using dedicated hardware, or may be implemented using a combination of software and hardware.

In the following description, information for management is described in a table format, but the information for management does not necessarily need to be represented using a data structure in the form of a table, but it may also be represented using a data structure in the form of a list, DB or queue, for example, or in other ways. Thus in order to indicate that there is no dependence on the data structure, 'table', 'list', 'DB', 'queue' or the like are in some cases referred to simply as 'information'.

In the following description, processes in the embodiments of the present invention are in some cases described taking 'program' as the subject (subject of action). By being executed using a processor, a program performs defined processes while using memory and communication ports (communication control apparatuses), and therefore the description may also take the processor as the subject. Part or all of a program may also be realized using dedicated hardware, and it may also be realized using modules. Various programs may also be installed on computers using a program distribution server or storage media.

The storage system of the present embodiment is a unified storage system in which file access requests and block access requests can be processed using a single system, and it is provided with a cluster configuration. Then, in the storage system of the present embodiment a block control portion is provided with a failure management function for integrally managing the failure state of an OS which uses a file system (hereinafter referred to as FOS).

The FOS operates on a virtual machine formed by a hypervisor, and it inputs and outputs files to/from a file system. The FOS is managed by the hypervisor, but information relating to FOS failures is consolidated in a block control portion separate from the hypervisor. The block control portion is a function for reading and writing data in block units from/to a disk device, and can also be called a 'block storage microcontroller'.

Thus in the present embodiment information relating to FOS failures is collected and managed not by the hypervisor, which is the direct manager of the FOS, but by a block control portion which is separate from the hypervisor. Block control portions are often used in key business operations of banks, stock brokerage firms and the like, and thus high reliability is required. Therefore in the present embodiment information relating to failures which occur within clusters is consolidated in a block control portion having high reliability. By this means the block control portion can address failures appropriately from the viewpoint of the overall storage system.

Further, in the present embodiment the block control portion preferentially retains the minimum necessary hardware resources, and the remaining hardware resources are distributed to the hypervisor and a plurality of FOSs. Therefore, because the block control portion retains the minimum necessary hardware resources, it can perform failure management appropriately even in conditions in which a large number of file access requests are being issued by a host apparatus.

FIG. 1 is an explanatory view illustrating in outline an embodiment of the present invention. FIG. 1 has been prepared in order to aid understanding of the present embodiment, and the present invention is not restricted to the configuration example illustrated in FIG. 1.

A storage system 30 is coupled such that it is capable of bilateral communication with a command issuing apparatus 101A which issues block access requests and a command issuing apparatus 101B which issues file access requests. The command issuing apparatuses 101A, 101B may also be called host apparatuses or host computers.

The storage system 30 is provided with a plurality of (for example two) clusters 50A, 50B in order to increase its availability. Cluster 50A, which is an example of a 'first cluster', and cluster 50B, which is an example of a 'second cluster', may have the same configuration. The configuration of portions unrelated to failover may differ between the clusters 50A and 50B.

The cluster configuration will now be described based on cluster 50A. Cluster 50A is provided for example with one or more (normally a plurality of) FOSs 311A, 312A, a hypervisor 313A which controls virtual machines operated by the FOSs 311A, 312A, a block control portion 314A and failure monitoring portions 43A. A plurality of failure monitoring portions 43A exist within the cluster, and the hardware which they monitor is predefined. Each piece of hardware is managed by at least one failure monitoring portion 43A. The failure monitoring portions 43A of one cluster 50A may be coupled to the failure monitoring portions 43B of the other cluster 50B by means of a path. The block control portions 314 may also exchange information via a path between the failure monitoring portions 43.

The FOSs 311A, 312A are OSs having a file interface, and operate on virtual machines created and managed by the hypervisor 313A. Examples of FOSs include for example NAS, retrieval systems and other OSs that operate on servers. In the following description, a description will be given based on the FOS 311A configured for example as an NAS.

The hypervisor 313A can manage a plurality of virtual machines. The hypervisor 313A manages the FOS 311A which operates on each virtual machine.

The block control portion 314A controls for example reading and writing of data from/to a disk device 34. The block control portion 314A has a block interface and is coupled to the command issuing apparatus 101A which issues block access requests such that they are capable of bilateral communication. A block control portion is a computer program for controlling block storage, and can also be called a block storage microcontroller.

The block control portion 314A of the first cluster 50A and the block control portion 314B of the second cluster 50B are coupled via a coupling portion 42 such that they are capable of bilateral communication. The block control portions appear as though they are provided individually in each cluster, but the block control portion 314A and the block control portion 314B are coupled using a coupling portion 42 and share information, and thus overall can be seen as a single block control portion 314 extending across the clusters 50A, 50B.

The storage system 30 is provided, as its hardware resources, with for example a microprocessor 31, a memory 32, a disk device 34, an HBA (Host Bus Adapter) communication port 35, and an NIC (Network Interface Card) communication port 36. The hardware resources are distributed between the clusters 50A, 50B. Further, from among the hardware resources, a preset prescribed amount of the hardware resources is preferentially allocated to the block control portion 314, and the other hardware resources are distributed via the hypervisors 313A, 313B to the FOSs 311A, 311B.

Read commands and write commands from the file interface are also ultimately converted into addresses, and are converted into block access requests. All of the data are stored as block data within the disk device 34. Therefore data requested by the file interface are also read to and written from the disk device 34 by means of block access requests executed by the block control portion 314A.

Thus read request processes and write request processes are both ultimately collected and processed by the block control portion 314. The block control portion 314, in which high reliability is required, is provided extending across the clusters 50A, 50B, forming the core section of the unified storage system. Accordingly in the present embodiment failure monitoring of the clusters 50A, 50B is also performed by the block control portion 314.

As discussed hereinabove the block control portion 314 of the storage system 30 achieves high reliability, and is assumed to operate constantly, 24 hours per day, 365 days per year. Therefore if the block control portion 314 were to fail, this would result in failure of the entire storage system 30, and the storage system 30 would shut down.

Here, in the present embodiment, 'failures' which are the target of failure monitoring do not include hardware failures which prevent execution of instructions entirely. By removing from the target of monitoring those failures which render execution of instructions impossible, in the present embodiment the block control portion 314, which has the highest reliability and which has a high probability of continuing to operate to the end, in a sense serves in place of a Quorum, consolidating and managing failures of the storage system 30.

With the present embodiment configured in this way, failures can be managed without using a special external apparatus for failure monitoring. Also, in the present embodiment, because a special external apparatus for failure monitoring is not provided, it is not necessary to couple an external apparatus to the storage system using a coupling cable. In the present embodiment the block control portion 314A of the first cluster 50A and the block control portion 314B of the second cluster 50B are coupled using a coupling portion 42 configured as an internal directly-coupled bus, and thus the cost of coupling can be reduced. Further, in the present embodiment there is no danger of failures occurring such as a cable breaking or becoming disconnected, and reliability can thus be improved.

In the present embodiment, by performing processing using an internal directly-coupled bus, occurrence of the so-called split-brain state is prevented, and if an FOS within one of the clusters fails and shuts down, failover to an FOS within the other cluster can be performed.

In the present embodiment, hardware resources are preferentially allocated to the block control portion 314 constituting the core of the unified storage system, such that the minimum necessary level of operation by the block control portion 314 is always possible. By combining preferential allocation of hardware resources to the block control portion 314 and consolidated management of failures by the block control portion 314, failures within the storage system 30 can be constantly monitored.

Embodiment 1

<Outline of System Configuration>

FIG. 2 is an explanatory view illustrating an example of the hardware configuration in a computer system including a storage system.

The computer system includes a storage system 30, command issuing apparatuses 101A, 101B which use the storage system 30, and a management apparatus 20 which manages the storage system 30 and the command issuing apparatuses 101A, 101B. A plurality of storage systems 30 may be provided. It should be noted that the storage system 30 can also be called a storage apparatus, a storage subsystem or a unified storage system.

The command issuing apparatuses 101A, 101B are computers which use the storage system 30. The command issuing apparatuses 101A, 101B are provided for example with an input device such as a keyboard, an output device such as a display, a CPU (Central Processing Unit), a memory, and a host bus adapter (HBA) or network interface adapter (NIC).

One of the command issuing apparatuses 101A is a computer which issues block commands for accessing logical storage resources provided in the storage system 30. The command issuing apparatus 101A can also be called a block command issuing apparatus.

The other command issuing apparatus 101B is a computer which issues file commands to the storage system 30. The command issuing apparatus 101B can also be called a file command issuing apparatus. By issuing file commands, the command issuing apparatus 101B indicates to the storage system 30 to write data to a file, read data from a file, or create or erase a file.

The block command issuing apparatus 101A is provided for example with an FC (Fibre Channel) or an iSCSI (internet Small Computer System Interface), which are block interfaces. The block command issuing apparatus 101A communicates via a communication network CN1 with HBAs 35A, 35B with which the storage system 30 is provided.

The file command issuing apparatus 101B is provided for example with an NFS (Network File System) or a CIFS (Common Internet File System), which are file interfaces. The file command issuing apparatus 101B communicates via a communication network CN2 with NICs 36A, 36B with which the storage system 30 is provided.

The command issuing apparatuses 101A, 101B may also be configured for example as a server, personal computer, portable information terminal, mobile telephone (including so-called smartphones), printer, digital camera, digital video camera or the like.

The management apparatus 20 manages the configuration of the storage area of the storage system 30. The management apparatus 20 is provided for example with an input device 210, an output device 220, a CPU 230, a memory 240, a network adapter 250, a disk drive 260 and the like.

The input device 210 is means of accepting input from an administrator or the like operating the management apparatus 20, and may for example comprise a keyboard, a voice-input apparatus or a tablet apparatus or the like. The output device 220 is means of indicating to an administrator the state of the management apparatus 20 and setting items, for example, and may for example comprise a display apparatus, a speech output apparatus or a printer or the like.

The CPU 230 reads a management computer program stored on the disk drive 260 into the memory 240 and executes management processes relating to the storage system 30 on the basis of the management computer program. Hereinafter the computer program is in some cases referred to in abbreviated form as a program. The memory 240 consists for example of RAM or the like, and stores programs, data and the like.

The network adapter 250 communicates via a management network CN3 with the command issuing apparatuses 101A, 101B and the storage system 30. The management network CN3 consists for example of an Ethernet (registered trademark) or the like. The disk drive 260 consists of a storage apparatus such as a hard disk apparatus, a flash memory device or the like, and it stores data and programs.

The configuration of the storage system 30 will now be described. The storage system 30 is configured as a unified storage system capable of processing both block commands and file commands simultaneously, and it is provided with a plurality of clusters 50A, 50B. Each cluster 50A, 50B has a controller board 41A, 41B. In the configuration of the storage system 30, the suffix 'A' or 'B' indicates the cluster to which an entity belongs. When the description does not specifically distinguish the cluster to which an entity belongs, the suffix is omitted.

The storage system 30 stores data in a storage area set up in the disk device 34. The storage system 30 is provided internally with a CPU 31 which is a control processor, a memory 32, a disk interface 33, an HBA 35 which is an FC interface (this is an HBA target, also called a host adapter), an NIC 36 which is a LAN interface, a management interface 37 and the like.

The CPU 31, memory 32, HBA 35, NIC 36 and disk interface 33 are mutually coupled via a bus 38. The bus 38 is for example a PCI-EX, but the bus 38 may also be configured using a switch.

The CPU 31 is an arithmetic processing apparatus which executes various programs and program modules stored in the memory 32. The CPU (control processor) 31 controls for example input and output of data to/from logical storage areas configured using the disk device 34.

The memory 32 is a so-called internal storage apparatus, including nonvolatile memory and volatile memory. Nonvolatile memory stores programs, configuration information and the like which are operated by the CPU 31. The volatile memory temporarily stores arithmetic processing results.

The nonvolatile memory within the memory 32 can be configured for example using a hard disk, flash memory or the like. The memory 32 is further provided with a cache memory area and a shared memory area. The cache memory area temporarily stores data read from or written to the disk device 34. The shared memory area stores for example configuration information for the storage system 30 and configuration information for the disk device 34.

The failure monitoring portion 45 is coupled to each component (hardware) 31 to 33, 35 to 37 within the cluster 50, and is a unit for monitoring the occurrence of failures in each piece of hardware. When the failure monitoring portion 45 detects the occurrence of a failure it reports to the processor 31 the hardware in which the failure has occurred.

The disk interface 33 is responsible for sending and receiving data between the disk device 34 and the memory 32 for example.

For the disk device 34 various storage apparatuses capable of reading and writing data may be used, for example a hard disk device, semiconductor memory device, optical disk device, magneto-optical disk device or the like. When a hard disk device is used, an FC (Fibre Channel) disk, SCSI (Small Computer System Interface) disk, SATA disk or SAS (Serial Attached SCSI) disk may for example be used.

Further, as the disk device 34, various storage apparatuses may also be used, such as for example flash memory, FeRAM (Ferroelectric Random Access Memory), MRAM (Magnetoresistive Random Access Memory), phase-change memory (Ovonic Unified Memory), RRAM (registered trademark) or the like. Moreover, the configuration may also be one in which the storage system 30 contains a mixture of different types of disk device, such as a flash memory device and a hard disk device 34.

A group of storage areas having one or a plurality of disk devices 34 is formed, and by demarcating storage areas of a fixed length or a variable length from the grouped storage area it is possible to create logical volumes, which are logical storage areas. The logical volumes mainly store user data. It should be noted that all or part of the programs executed by the CPU 31 may also be stored in the disk device.

The storage system 30 in the present embodiment is configured as a so-called unified storage system, and it is therefore provided with both a host-side interface (HBA) 35 for processing block commands and a host-side interface (NIC) 36 for processing file commands.

The HBA 35 is coupled via the network CN1 to the block command issuing apparatus 101A and has a plurality of communication ports. The HBA 35 exchanges commands and data with the block command issuing apparatus 101A. The network CN1 is for example an FC, Ethernet (registered trademark) or the like.

The NIC 36 is coupled via the network CN2 to the file command issuing apparatus 101B and has a plurality of communication ports. The NIC 35 exchanges commands and data with the file command issuing apparatus 101B by means of a protocol such as NFS, CIFS or the like. The network CN2 is configured for example as a LAN or the like.

The command issuing apparatuses 101A, 101B are coupled to the management apparatus 20 via the management network CN3. The command issuing apparatuses 101A, 101B send and receive data (management information) required for system management to/from the management apparatus 20.

The storage system 30 is provided with a maintenance and management interface 37 configured for example as a LAN. The maintenance and management interface 37 is coupled to the CPU 31. If a failure arises in a location other than the CPU 31 in the storage system 30, the CPU 31 can report information relating to the failure to the management apparatus 20 via the maintenance and management interface 37.

<Cluster Configuration>

The configuration of the clusters with which the storage system 30 is provided will now be described. The storage system 30 is provided with a plurality of clusters 50A, 50B in order to increase its availability.

Controller boards 41A, 41B for controlling the clusters 50A, 50B are provided in the storage system 30. One of the controller boards 41A controls one of the clusters 50A, and can also be called a first controller board. The other controller board 41B controls the other cluster 50B, and can also be called a second controller board.

The CPU 31A in one of the controller boards 41A and the CPU 31B in the other controller board 41B are coupled via the coupling portion 42 such that they are capable of bilateral communication. The coupling portion 42 is configured for example as a dedicated line bus, a switch or the like. Here, it is a dedicated path which communicates directly between the CPUs.

One of the CPUs 31A can access the other CPU 31B via the coupling portion 42. Similarly, the other CPU 31A can access the one of CPUs 31A via the coupling portion 42.

Each cluster 50A, 50B is provided with a controller board 41, an HBA 35, an NIC 36, a disk interface 33 and a maintenance and management interface 37. As discussed above, elements belonging to cluster 50A have the suffix 'A', and elements belonging to the cluster 50B have the suffix 'B'.

Cluster 50A and cluster 50B are grouped in a cluster configuration in order to increase availability. By way of example, a description will now be given of how availability is improved, taking as an example an FOS, which is an OS which uses a file system. An FOS in cluster 50A and another FOS in cluster 50B are grouped in advance into a cluster configuration. The first cluster 50A is assumed to be a main cluster.

If a failure occurs in the FOS on the main cluster 50A side, a failover process to the FOS in the sub-cluster 50B is executed. In the failover process the FOS in the sub-cluster 50B performs processing in place of the FOS in the main cluster 50A, and continues to offer services to the file command issuing apparatus 101. The reliability of the storage system 30 in the present embodiment is increased by adopting a cluster configuration. Failure detection methods and the like will be discussed hereinafter.

FIG. 3 illustrates in summary the software configuration within each CPU 31. The CPU 31 implements the FOSs 311, 312, 315, the hypervisor 313 and the block control portion 314 by executing prescribed programs.

The hypervisor 313A virtualizes the file interface OSs—311A, 312A, 315A—in the cluster 50A. The block control portion 314A is visible to the hypervisor 313A. Similarly, the hypervisor 313B virtualizes the file interface OSs 311B, 312B, 315B in the cluster 50B. The block control portion 314B is visible to the hypervisor 313B.

The clusters 50A and 50B are each equipped with block control portions 314, but these act as a single common controller which extends across cluster 50A and cluster 50B. Each block control portion 314A and the block control portion 314B are managed in such a way that the control information within the memories that they respectively use is always identical to the control information used by the counterpart block control.

Therefore the block control portion 314A in one of the clusters 50A can process requests from the file interface and requests from the block interface in the other cluster 50B. Similarly the block control portion 314B in the other cluster 50B can process requests from the file interface and requests from the block interface in the one of the first clusters 50A. Thus the block control portions 314A, 314B in each of the clusters 50A, 50B act as a single common control, and they can therefore process requests from the file system interface and requests from the block interface in a different cluster.

The block control portions 314A, 314B behave overall as a single control, but if processing is performed via the coupling portion 42 a significant increase in overhead will occur. Therefore in principle a request is processed by the block control in the cluster which received the request. In other words, requests received by the cluster 50A are processed by the block control portion 314A and requests received by the cluster 50B are processed by the block control portion 314B.

The block control portion 314 is one example of a function which offers a service by means of the block interface. Examples of functions which offer services by means of the file interface include for example file systems, retrieval systems and OSs that operates on a server.

The FOSs 311, 312, 315 and the block control portions 314 operate on cores of the CPU 31, which is a control processor. Because in practice OSs are programs, they are situated in the memory 32 and the CPU 31 reads and operates the programs. In FIG. 3 the OSs are indicated on CPU cores for convenience of explanation. A package equipped with one CPU usually contains a plurality of cores. In order to provide redundancy to handle failures and the like, packages are increased or decreased in multiples of two. In other words, the number of packages in a minimum configuration is two.

In relation to the way in which processor cores are used, OSs of the same type may be centralized onto the same package, or OSs of the same type may each be dispersed among different packages. The design differs depending on whether preference is given to performance or availability.

<Virtualization Program (Hypervisor)>

Because the hypervisor 313 is also software it is stored in the memory 32. Because the hypervisor 313 operates respectively on each OS 311, 312, 315 it does not correspond to a core. In FIG. 3, a certain control processor 31, in other words a CPU package, is provided with a plurality of cores, and the FOS 311, a retrieval system 312, a server OS 315 and the block control portion 314 mounted on each core.

The hypervisor 313 is incorporated into each of the FOS 311A, the retrieval system OS 312 and the server OS 315. The FOS 311, the retrieval system 312 and the server OS 315 are operated on the hypervisor 313.

In the example in FIG. 3, in one CPU 31A the FOSs 311A, 312A, 315A, the hypervisor 313A and the block control portion 314A are installed on each core. In the other CPU 31B, the FOSs 311B, 312B, 315B, the hypervisor 313B and the block control portion 314B are installed on each core. It should be noted that the hypervisor 313 may also operate on a specific core from among a plurality of cores.

In the present embodiment prescribed hardware resources from among the hardware resources with which the storage system 30 is provided are allocated preferentially to the block control portion 314. Then the remaining hardware resources are allocated via the hypervisor 313 to the FOSs 311, 312, 315. In the following explanation, for convenience the FOSs 311, 312, 315 are in some cases represented as 'FOS 311 and the like'.

In the present embodiment the hardware resources are divided logically, and virtual machines are created using the divided hardware resources. Creation and termination of the virtual machines are managed by the hypervisor 313. The FOS 311 and the like operate on the virtual machines, and the FOS 311 and the like process file commands issued by the file command issuing apparatus 101B.

<Memory>

The memory 32 may comprise a mixture of a plurality of types of memory having different characteristics, for example nonvolatile memory and volatile memory. In the present embodiment the memory is duplexed to maintain redundancy. Configuration information, control information, cache data and the like are stored in the memory 32. An example of configuration information is information for managing the configuration of the storage system 30. Examples of control information include information for managing request commands, address mapping and the like. Examples of cache data include write data received from the command issuing apparatus and read data read from the disk device 34.

The areas used respectively for the memory which stores the control information (or configuration information) and the memory which stores data (for example cache memory) should be separated, either logically or physically, and there is no restriction to the type of memory. The memory which stores the control information and the memory which temporarily stores data should be separated physically or logically from the areas used respectively for the block control portion 314, the FOSs 311 and the like and the hypervisor 313.

FIG. 4 illustrates an example of the allocation of the memory 32. In this and subsequent drawings, the suffixes 'A' and 'B' indicating a differentiation between the related clusters are omitted. For example, the memory 32 storage configuration illustrated in FIG. 4 illustrates both the configuration of the memory 32A in the cluster 50A and the configuration of the memory 32B in the cluster 50B. The same applies in the other drawings (FIG. 5 to FIG. 8).

The memory 32 consists of a plurality of memories which are separated physically. The memory 32 is provided with a memory 321 which stores control information and a memory 322 which stores data. The memories 32A, 32B in the clusters 50A, 50B are each provided with the configuration illustrated in FIG. 4. FIG. 4 illustrates an example of the memory allocation, without differentiating between clusters.

The memory spaces for the memories 321, 322 are divided between the OSs which use the memories 321, 322. Each OS can only recognize the memory space allocated to itself, and cannot recognize memory spaces allocated to other OSs. In the following description, memory space is in some cases called memory area or memory.

For example, of the control memory 321 the FOS 311A can only recognize the memory space 3211 allocated to the FOS 311, and of the data memory 322 it can only recognize the memory space 3221 allocated to the FOS 311, and can only use these memory spaces 3211, 3221. Similarly, of the control memory 321 the FOS 312 can only recognize and use the memory space 3212 allocated to the FOS 312, and of the data memory 322 it can only recognize and use the memory space 3222 allocated to the FOS 312. The FOS memory spaces 3211, 3212 in the control memory 321 store computer programs for implementing the FOSs 311, 312. It should be noted that an explanation regarding the FOS 315 has been omitted.

Of the control memory 321 the hypervisor 313 can only recognize and use the memory space 3213 allocated to the hypervisor 313, and of the data memory 322 it can only recognize and use the memory space 3223 allocated to the hypervisor 313.

Of the control memory 321 the block control portion 314 can only recognize and use the memory space 3214 allocated to the block control portion 314, and of the data memory 322 it can only recognize and use the memory space 3224 allocated to the block control portion 314.

The memory 32 contains areas used jointly by different OSs. The memory space 3215 of the control memory 321 is recognized by the hypervisor 313 and the FOS 311 and the like, and is used jointly by the hypervisor 313 and the FOS 311 and the like. The memory space 3216 of the control memory 321 is recognized by the hypervisor 313 and the block control portion 314, and is used jointly by the hypervisor 313 and the block control portion 314.

The memory space 3217 of the control memory 321 stores information to be referred to when failover of the FOS 311 or the like is performed. For example, failover information includes for example the LU number for which the FOS is responsible, and information indicating whether or not it is mounted on the LU.

Thus by providing shared memory areas it is possible for prescribed information to be transmitted between the FOS 311 and the like and the hypervisor 313, and between the hypervisor 313 and the block control portion 314. Moreover, information can also be transmitted between the clusters 50A, 50B. The transmission method is discussed hereinafter.

The shared memory areas will now be described in more detail. For example, the area used by an FOS is an area that can normally only be accessed by that FOS. However, by permitting the hypervisor 313 to have access to part of the memory area used by the FOS it is possible to create an area for sharing information between the FOS 311 and the like and the hypervisor 313.

Similarly, by permitting the block control portion 314 to have access to part of the memory area used by the hypervisor 313, or by permitting the hypervisor 313 to have access to part of the memory area used by the block control portion 314, it is possible to provide an area for sharing information between the block control portion 314 and the hypervisor 313.

Of the control memory 321 the block control memory space 3214 allocated to the block control portion 314 stores various programs that are read into and executed by the processor 31, configuration information relating to logical volume settings, and pool information relating to pool settings. Of the data memory 322 the block control memory space 3224 allocated to the block control portion 314 stores forwarding data and the like.

Examples of various programs that are read into and executed by the control processor (CPU) 31 will now be described with reference to FIG. 5. The block control memory space 3214 for example stores a command control program P10, a configuration control program, a failure integrated management program P12, a failure detecting program P13, a failure reporting program P14 and a failure recovery program P15.

The command control program P10 is a program for interpreting commands from the command issuing apparatuses 101A, 101B or the management apparatus 20 and executing processes prescribed by the commands.

The configuration control program P11 is a program for setting the configuration of the storage system 30 and executing processes for updating the configuration information, for example. It should be noted that although it is omitted from FIG. 5, a disk I/O program is a program which controls input and output of data to/from the disk device 34.

The failure integrated management program P12 is a program for managing in an integrated manner information relating to failures that occur in the hardware and for deciding upon a failure processing strategy.

The failure detecting program P13 is a program for detecting the occurrence of failures. By using the failure detecting program P13, the block control portion 314 and the hypervisor 313 each monitor the life or death of the other. The hypervisor 313 and the FOS 311 and the like also each monitor the life or death of the other, using the failure detecting program P13. The failure detecting program P13 can detect not only hardware failures but also software failures.

The failure reporting program P14 is a program for sending reports mutually between the block control portion 314, the hypervisor 313 and the FOS 311 and the like when a failure has occurred. The failure recovery program P15 is a program which executes processes to effect recovery following a failure.

The block control memory space 3214 also stores management information for control. Examples of management information for control include LU management information T10, an address management table T11, a hardware resource management table T12, and a failure management table T13.

Configuration information is information relating for example to virtual devices, logical devices, pool hierarchies, RAID (Redundant Arrays of Inexpensive Disks) groups and the like, required for setting the storage system 30 environment. Examples of configuration information include the logical device (LU: Logical Unit) management table T10 and the address management table T11.

The logical device management table T10 manages for example details of the RAID group from which a logical device, which is a logical volume, is demarcated, and details of the disk device 34 from which the RAID group is configured. Further, the logical device management table T10 can also manage for example the size of a logical device, the amount used, and information relating to the command issuing apparatus which uses the logical device.

The address management table T11 stores for example information for mapping target devices to logical devices, information for mapping logical devices to virtual devices, and information for mapping virtual devices to physical devices.

By referring to the address management table T11 the storage system 30 is able to find the corresponding logical device and address for an address in a target device. Further, the storage system 30 is also able to find the corresponding virtual device and address for an address in a logical device. Moreover, the storage system 30 is also able to find the RAID group to which an address in a virtual device belongs, and to find the corresponding physical device and address.

It should be noted that the actual storage destination for data is decided upon by the block control portion 314. As is usual, the block control portion 314 can write data to the disk device 34 having a host physical address which has been converted from a guest physical address. Alternatively, if implementing so-called capacity virtualization, the block control portion 314 writes data to the disk device 34 which has a real page that is allocated to a virtual device (virtual logical volume).

For example, the block control portion 314 hierarchically manages a plurality of logical devices in pools, separated by performance, and in response to a write request from a virtual device it allocates a storage area (real page) in the pooled logical devices to the write destination address of the virtual device. The block control portion 314 writes the write data to prescribed addresses in the real pages allocated to the virtual device. Further, in some cases the storage system uses a disk device with which another external storage system (a so-called external storage system) is provided. In this case the block control portion 314 converts commands received from the block interface or the file interface into commands for accessing the external storage system, and reads and writes data from/to the disk device of the external storage system.

For each piece of hardware with which the storage system 30 is provided, the hardware resource management table T12 specifies whether the hardware is operating or is shutdown through failure, and specifies which of the block control portion 314 or the FOS 311 or the like is using the hardware. Details of the hardware resource management table T12 will be described with reference to FIG. 6.

As discussed hereinabove, the block control portion 314 uses hardware resources that are independent from the hardware resources used by the FOS 311 and the like on the hypervisor 313.

FIG. 5 also illustrates programs and the like executed by the hypervisor 313. The control memory 3213 used by the hypervisor 313 stores a program P23 which detects failures, a program P24 which reports detected failures to a prescribed reporting destination that has been set up in advance, a failure recovery program P25 and a table T22 which manages hardware resources used by the hypervisor 313. The failure recovery program P25 is a program whereby the hypervisor 313 executes failure processes in accordance with indications from the block control portion 314.

The control memory 3211 (or 3212) used by the FOS 311 and the like stores a program P33 which detects failures, a program P34 which reports detected failures to a prescribed reporting destination that has been set up in advance, a failure recovery program P35 and a table T32 which manages hardware resources used by the FOS 311 and the like. The failure recovery program P35 is a program which executes failure processes in accordance with indications from the block control portion 314.

An example of the hardware resource management table T12 used by the block control portion 314 is presented using FIG. 6. The block control portion 314 manages all of the hardware resources with which the storage system 30 is provided. Because the block control portion 314 has a grasp of all of the hardware resources with which the storage system 30 is provided, failures which occur in these hardware resources can be consolidated and managed by the block control portion 314.

The hardware management table T12 contains for example a processor management table T120, a memory management table T121, a disk management table T122 and a port management table T123.

The processor management table T120 is a table which manages the CPUs 31 with which the storage system 30 is provided, and it maps and manages for example the resource name, the details thereof, and whether each element is defined or undefined. A name ('name' includes an identifier, number or the like. The same applies hereinafter) is stored in 'Resource name' allowing the CPU 31 in the storage system 30 to be uniquely specified. Details of the CPU specified by the resource name are stored in 'Details'. Detailed information is for example information for specifying the cores (for example the core number) contained in the CPU. 'Defined/undefined' indicates whether or not it is a resource used by the block control portion 314. If it is a resource that is used by the block control portion 314 then 'defined' is recorded, and if it is a resource that is not used by the block control portion 314 then 'undefined' is recorded.

In the example illustrated in FIG. 6, 'CPU1' and 'CPU2' are allocated to the block control portion 314, and therefore 'Defined' is recorded in the 'Defined/undefined' column. 'CPU3' is not allocated to the block control portion 314, and therefore 'Undefined' is recorded in the 'Defined/undefined' column.

It should be noted that the configuration may also be such that for resources that are not allocated to the block control portion 314, a specific allocation destination is recorded instead of recording 'Undefined'. For example, if 'CPU3' is used by the hypervisor 313, 'Hypervisor' is recorded in the 'Defined/undefined' column. Similarly, if 'CPU3' is allocated to the FOS 311, 'FOS 311' is recorded in the 'Defined/undefined' column.

By acquiring from the hypervisor 313 and the FOS 311 and the like information relating to resources that have already been allocated to the hypervisor 313 and the FOS 311 and the like, the block control portion 314 can record specific allocation destinations in the hardware resource management table T12.

The memory management table T121 is a table which manages the memory 32 with which the storage system 30 is provided, and it maps and manages for example the resource name, the address, and whether each element is defined or undefined.

A name is set in 'Resource name' allowing the memory 32 to be uniquely specified within the storage system 30. The address space (memory space) of the memory specified by the resource name is stored in 'Address'. 'Defined/undefined' records whether or not each address space in the memory is allocated to the block control portion 314.

In the example in FIG. 6, the area of the memory 'DMM1' with addresses 0-1000 is retained by the block control portion 314. The area of the memory 'DMM1' with addresses 1001-2000 is for example shared with the FOS 311 and the like or the hypervisor 313.

For example, if the FOS 311 receives a read command or a write command from the file command issuing apparatus 101B, the FOS 311 requests the block control portion 314 to read or write data from/to the disk device 34. If the FOS 311 is to request the block control portion 314 to perform the process it converts the command and stores the converted command in an address shared by the FOS 311 and the block control portion 314. Both the FOS 311 and the block control portion 314 can access the shared address.

It should be noted that the memory management table T121 does not manage information regarding whether or not an address space is shared, or with whom it is shared. The 'Defined/undefined' column is only used to manage whether or not the space is available to the block control portion 314.

The disk management table T122 is a table which manages the disk devices with which the storage system 30 is provided, and it maps and manages for example the resource name and whether it is defined or undefined. A name allowing the disk device to be uniquely specified within the storage system 30 is stored in 'Resource name'. 'Defined/undefined' records whether or not the disk device specified by the resource name is allocated to the block control portion 314.

The port management table T123 is a table which manages the communication ports with which the storage system 30 is provided. As discussed hereinabove, the storage system 30 in the present embodiment is configured as a so-called unified storage system, and it is provided with a port (the NIC 36 communication port) which accepts file commands and a port (the HBA 35 communication port) which accepts block commands.

The port management table T123 maps and manages for example the resource name and whether it is defined of undefined. A name allowing the communication port to be uniquely specified is stored in 'Resource name'. 'Defined/undefined' records whether or not the communication port specified by the resource name is allocated to the block control portion 314.

It should be noted that FIG. 6 illustrates one communication port for block commands and one communication port for file commands, but in practice the storage system 30 is provided with a plurality of communication ports for block commands and a plurality of communication ports for file commands.

Based on information in the hardware management tables T120 to T123, the block control portion 314 creates tables T124, T125 which manage only the hardware resources allocated to the block control portion 314.

For example, the block control processor management table T124 is a table which manages only the processor resources allocated to the block control portion 314, and it maps and manages the resource name and the usage state. The block control processor management table T124 is created based on information stored in the processor management table T120.

A name allowing a CPU allocated to the block control portion 314 to be uniquely specified within the storage system 30 is stored in 'Resource name' in table T124. The usage state of the CPU specified by the resource name is recorded in 'Usage state'. If in normal use by the block control portion 314 then 'In use' is recorded, and if a failure has occurred then 'Failure has occurred', 'In process of being shutdown' or the like is recorded.

According to the block control processor management table T124 illustrated in FIG. 6 it can be seen that 'CPU1' and 'CPU2' are allocated to the block control portion 314, and that the block control portion 314 is using both 'CPU1' and 'CPU2' normally.

The block control memory management table T125 is a table which manages only the memory allocated to the block control portion 314, and it is created based on the memory management table T121. The block control memory management table T125 maps and manages a name which uniquely specifies the memory within the storage system 30 and an address. By this means all of the memory areas (address spaces) available to the block control portion 314 can be immediately ascertained.

In FIG. 5 it appears as though the hardware resource management table T12 used by the block control portion 314 is stored in the control memory space for block control 3214, but the memory management table T121 from the hardware resource management table T12 is preferably stored in the memory space 3216 shared by the block control portion 314 and the hypervisor 313 (FIG. 4). This is to allow the block control portion 314 and the hypervisor 313 to use the memory management table T121 jointly. It should be noted that a configuration may also be adopted whereby a copy of the information from the memory management table T121 that is used jointly by the hypervisor 313 is placed in the shared memory space 3216.

FIG. 7 illustrates the hardware resource management table T22 held by the hypervisor 313. The hardware resource management table T22 contains for example a processor management table T220, a memory management table T221, and a virtual resource management table T222. The processor management table T220 and the memory management table T221 are management information used by the hypervisor 313, and are therefore stored in the hypervisor memory area 3211 (FIG. 5).

The processor management table T220 is a table which manages the CPUs 31 allocated to the hypervisor 313, and it maps and manages the resource name and the usage state. A name is recorded in 'Resource name' uniquely specifying the CPU within the storage system 30. The usage state (for example 'In use' or 'In process of being shutdown') of the CPU specified by the resource name is recorded in 'Usage state'.

The memory management table T221 is a table which manages the memory 32 allocated to the hypervisor 313, and it maps and manages for example the resource name, the address, the usage state and the user.

A name allowing the memory to be uniquely specified within the storage system 30 is recorded in 'Resource name'. The address space (memory space) of the memory specified by the resource name is recorded in 'Address'. The usage state (for example 'In use' or 'In process of being shutdown') of each address space in the memory is recorded in 'Usage state'. The user (hypervisor, FOS) of each address space in the memory is recorded in 'User'.

Here, in the present embodiment the hardware resources with which the storage system 30 is provided are allocated preferentially to the block control portion 314 and the remaining hardware resources are allocated to the hypervisor 313 and the FOS 311 and the like.

As discussed above, the block control portion 314 manages all of the hardware resources within the storage system 30 (CPUs, memory, disks, ports) using the hardware resource management table T12. From among all the hardware resources with which the storage system 30 is provided, the hardware resources allocated to the block control portion 314 are set to 'defined'. Accordingly, the hardware resources set to 'undefined' from among the hardware resources recorded in the hardware resource management table T12 held by the block control portion 314 are recorded in the hardware resource management table T22 held by the hypervisor 313.

A representation of the port management table for managing the communication ports is omitted from the hardware resource management table T22 in FIG. 7. It should be noted that the disk management table for managing disks is omitted in FIG. 7.

It should be noted that in the memory management table T221 the address space with addresses '1001 to 2000' is an area shared with the block control portion 314, but here it is managed as an area of the hypervisor 313.

The hypervisor 313 shows hardware resources to the FOS 311 and the like in a virtualized form. Thus as illustrated in the virtual resource management table T222 the hypervisor 313 allocates the physically single 'CPU3' as a plurality of virtual CPUs ('VCPU' in the drawing) to the FOS 311 and the like which are managed on the hypervisor 313. If a physical failure occurs in a CPU it is possible to identify which FOS is affected by the physical failure of the CPU by referring to the virtual resource management table T222. In the example illustrated in the drawing, the virtual CPUs 'VCPU1', 'VCPU3' and 'VCPU4' are allocated to 'FOS1', and 'VCPU2' is allocated to 'FOS2'.

FIG. 8 illustrates an example of a hardware resource management table T32 held by an FOS. The hardware resource management table T32 is stored in the memory area 3212 dedicated to the FOS, and contains for example a processor management table T320 and a memory management table T321.

Each FOS manages only the hardware resources which it can itself use. Tables for managing disks and communication ports are omitted. With regard to memory areas which are shared with the hypervisor 313, the FOS can also use these memory areas and so they are managed by setting the 'usage state' column to 'In use'.

<Hardware Configuration>

FIG. 9 illustrates a situation in which the block control portion 314 and elements other than the block control portion 314, namely the hypervisor 313 and the FOS 311 and the like, each retain hardware resources with which the storage system 30 is provided.

In FIG. 9 the block control portion 314 is illustrated as a single block control extending across the clusters. The hypervisor 313 and the FOS 311 and the like are each provided in a plurality of clusters 50A, 50B. In FIG. 9, only a single FOS is illustrated for convenience, and so this is referred to hereinafter as the FOS 311.

As discussed hereinabove, in the present embodiment at least the minimum hardware resources necessary for processing block commands and for failure management are allocated preferentially to the block control portion 314 constituting the core of the unified storage system 30, the remaining hardware resources being distributed via the hypervisor 313 to the FOS 311.

The hypervisor 313 allocates hardware resources to the FOS 311 using LPAR (Logical PARtitioning), a technique for logically dividing resources. As discussed hereinabove, hardware resources include CPUs 31, memory 32, communication ports 35 and 36, and failure monitoring portions 43 which are hardware circuits for failure monitoring.

In this example only the block control portion 314 uses the disk 34, and the hypervisor 313 and the FOS 311 do not use the disk 34. If the hypervisor 313 and the FOS 311 use the disk 34 then the disk 34 is also logically divided and allocated. Further, the disk interface 33 is only used by the block control portion 314 and it is thus not allocated to the hypervisor 313 or the FOS 311.

In FIG. 9 two types of alphabetic character are appended to each hardware resource to indicate its attributes. The first alphabetic character specifies the allocation destination program. 'S' indicates the FOS, 'H' indicates the hypervisor, and 'C' indicates the block control. The second alphabetic character indicates the cluster to which the resource belongs. 'A' represents that it belongs to cluster 50A, and 'B' that it belongs to cluster 50B. Because the block control portion 314 is provided extending across the clusters, the second alphabetic character indicating the cluster to which a resource belongs is not appended.

Alphabetic characters indicating each of the sharing parties are used as the first alphabetic characters appended to memory used for sharing information between programs (these may also be referred to as functions). 'SH' is appended to the memory shared by the FOS 311 and the hypervisor 313. 'HC' is appended to the memory 32 shared by the hypervisor 313 and the block control portion 314.

The memories 32SHA, 32SHB shared by the FOS 311 and the hypervisor 313 correspond to the memory areas 3215, 3225 in FIG. 4. FIG. 4 does not distinguish by cluster, but if it were to distinguish, the memory 32SHA would correspond to memory areas 3215A and 3225A, and the memory 32SHB would correspond to memory areas 3215B and 3225B. The memory areas 32HCA, 32HCB shared by the hypervisor 313 and the block control portion 314 correspond to the memory areas 3216, 3226 in FIG. 4. If FIG. 4 were to distinguish between clusters, the memory 32HCA would correspond to memory areas 3216A and 3226A, and the memory 32HCB would correspond to memory area 3216B.

The failure integrated management program P12 (FIG. 5) which performs failure processing for the entire storage system 30 is placed in the memory 32C (corresponding to the memory area 3214 in FIG. 4) of the block control portion 314. The block control portion 314 uses the failure integrated management program P12 to manage reports of failures occurring in each piece of hardware in an integrated manner and to decide how to handle failures. Examples of the content of processes used to address failures include shutdown, fallback and failover.

The failure monitoring portion 43 will be described. For example, by logically dividing one or a plurality of failure monitoring portions 43, these can be allocated respectively to the FOS, the hypervisor and the block control portion. The failure monitoring portion 43 monitors failure information storage areas in the memory areas. For the shared memory areas 32SH, 32HC, it is sufficient for either one of the failure monitoring portions 43 allocated to the sharing OSs to perform monitoring. For example, in FIG. 9 the memory area 32SHA shared by the FOS 311A and the hypervisor 313A should be monitored by either one of the failure monitoring portions 43SA or 43HA.

<Failure Processing System>

Failure processing in the unified storage system 30 will be described.

<Outline of System for Detecting Failures in Hardware>

A description will be given of a method for detecting failures by receiving failure reports from hardware, and a method of reporting failures. In some cases below, the FOS 311 and the like, the hypervisor 313 and the block control 314 are referred to as operating systems (OSs).

It is possible to conceive of a method in which failures are reported to all OSs (the FOS, the hypervisor, the block control) and a method in which a report is sent only to the OS which manages the location of the failure, but here a case is described in which a report is sent to all of the OSs, with reference to FIG. 10.

The failure monitoring portion 43, which is hardware for monitoring failures, detects hardware failures in the CPUs 31, the ports 35 and 36, the memory 32, and the disks 34 and the like. The failure monitoring portion 43 monitors failures by regularly checking the state of the hardware or by receiving information from the hardware notifying it that a failure has occurred. Examples of information used as notification that a failure has occurred include for example signals, messages, interrupts and data.

For example, if a failure occurs in a hardware resource such as a CPU 31, memory 32, or a communication port 36, the failure monitoring portion 43 receives information from the failed hardware indicating that a failure has occurred, and it recognizes that a failure has occurred (S10).

'Failure information' shown in the memory areas in FIG. 4 is a failure information storage area for storing failure information for each piece of hardware, and is set up in advance within the memory 32. The failure monitoring portion stores the failure information received from the failed hardware in the failure information storage areas within each of the memory areas, in order to communicate the failure to the FOS 311, the hypervisor 313 and the block control 314 (S11 to S13).

In FIG. 10, the occurrence of the hardware failure is reported to all of the OSs (the FOS, the hypervisor, the block control). Thus the failure information is recorded in the failure information storage areas within the memory 32C (3224) used by the block control 314, the memory 32H (3223) used by the hypervisor 313 and the memory 32S (3221, 3222) used by the FOS. In another method, the failure information may be stored in the memory areas 32SH (3225) and 32HC (3226) which are shared by a plurality of OSs.

Upon receiving the failure information from the failure monitoring portion 43, each OS determines whether it is itself the OS responsible for managing the failed hardware (S14 to S16). Here, assume that a failure has occurred in hardware managed by the FOS 311.

If the FOS 311 judges that the failure has occurred in hardware for which it is responsible (S14: YES), it investigates the details of the failure and creates a report (S17). In order to send a report to the block control 314, the FOS 311 temporarily records the detailed report in the failure information storage area of the memory area 3225 which it shares with the hypervisor 313 (S18), and waits (S19). Here, taking an example of a failure in a CPU, the detailed failure report can include for example the number of the core which has been shut down through failure, the extent and type of the failure, and the symptoms.

The hypervisor 313 monitors the memory area 3225 shared with the FOS 311 from time to time and finds detailed failure reports. The hypervisor 313 records the detailed report in the failure information storage area within the memory area 3226 which it shares with the block control 314 (S22).

The block control portion 314 monitors the memory area 3226 shared with the hypervisor 313 from time to time and detects the detailed failure report (S23). Thus if a failure occurs in hardware used by the FOS 311, information relating to the failure is reported without exception via the hypervisor 313 to the block control portion 314.

The block control portion 314 decides upon a processing method (failure processing) for addressing the failure based on the detailed failure report (S24). For example, the block control portion 314 decides upon the contents of specific indications such as which piece of hardware to shut down.

In order to transmit an indication to execute the contents that have been decided upon to the FOS 311, which is the party that manages the element in which the failure occurred, the block control portion 314 records the indication in the failure information storage area of the memory area 3226 which it shares with the hypervisor 313 (S25).

When the hypervisor 313 finds the indication from the block control portion 314 in the memory area 3226 which it shares with the block control portion 314, it records the indication in the failure information storage area of the memory area 3225 which it shares with the FOS 311 (S26).

By monitoring the memory area 3225 which it shares with the hypervisor 313, the FOS 311 detects the indication from the block control portion 314 (S27). The FOS 311 implements failure processing in accordance with the indication from the block control portion 314 (S28).

It should be noted that the hypervisor 313, which is not responsible for the hardware in which the failure occurred, enters a waiting state (S20), and fulfills only the role of transmitting the detailed report and the failure processing indication. Because the block control portion 314, which is not responsible for the hardware in which the failure occurred, does not need to create a detailed failure report or the like, it also waits (S21). However, in order for the block control portion 314 to consolidate and manage failures in the storage system 30 and fulfill the role of indicating the execution of processes relating to failures, it receives the detailed failure report (S23) and creates and issues the indication for addressing the failure (S24, S25).

A description is given of an example in which a failure occurs in hardware managed by the FOS 311. For example, the FOS 311 is monitoring the state of the NICs 36 to which it is coupled. The NIC 36 is normally duplexed. If a failure occurs in one of the NICs 36, an alternative path configuration is released resulting in a single path configuration, and communication processing continues using the other NIC 36.

In such a case, the failure is reported by the FOS 311 via the hypervisor 313 to the block control portion 314 as a failure that has occurred in the NIC 36. It is not reported to the block control portion 314 as a failure of the FOS 311.

If the block control portion 314, which has received the report relating to the failure of the NIC 36, determines that it is a failure that the FOS 311 is capable of processing, then it may judge that there is no need to indicate how to process the failure, and may simply do no more than mange the failure condition. In this case steps S25 to S28 in FIG. 10 are omitted, and in a step performed instead of step S24 the failure information is stored and the process ends.

Thus the failure monitoring portion 43 monitors the occurrence of failures in each piece of hardware, and when a failure occurs it reports the occurrence of the failure to all of the OSs (the FOS, the hypervisor, the block control portion) in the same cluster.

Therefore it is not necessary to manage the destinations of failure reports individually for each piece of hardware, and it is straightforward to handle situations in which hardware is added to the storage system 30 or is modified. Thus in the present embodiment failure management costs can be further reduced by combining a configuration for consolidating and managing failures that occur in the storage system with the block control portion 314 which constitutes the core of the storage system 30.

The above explanation illustrated by way of example a case in which processing could be performed by the FOS, but in some cases it may be necessary for processing to be handed over from the FOS 311 using the NIC 36 in which the failure occurred to the FOS 311 in a cluster of another system, without addressing the failure in the FOS. This is for example a case in which a failure occurs in one of the NICs, and an alternative path configuration cannot be maintained. In this case the block control portion 314 decides in step S24 that failover will be performed. In step S28 the FOS 311 executes a fileover indication. Specifically, the processes from step S25 in FIG. 10 change to the processes from step S69 in FIG. 15 discussed hereinafter, and processing is handed over to another cluster.

FIG. 11 is a flowchart illustrating the operation when a failure has occurred in hardware managed by the hypervisor 313. Steps S10 to S16 are the same as discussed in FIG. 10. When the failure monitoring portion 43 detects a hardware failure (S10) it communicates to the FOS 311, the hypervisor 313 and the block control portion 314 respectively by storing the failure occurrence in the prescribed memory (S11 to S13).

If the FOS 311 determines that the communicated failure did not occur in hardware which it manages (S14: NO), it waits (S30).

The hypervisor 313 determines that the failure occurred in hardware which it manages (S15: YES), and creates a detailed failure report (S31). The hypervisor 313 records the detailed failure report in the memory area 3226 which it shares with the block control portion 314 (S32), and waits (S33).

When the block control portion 314 detects a detailed failure report from the hypervisor 313 (S23: YES) it decides upon the processing content for the failure (S24) and records in the memory area 3226 which it shares with the hypervisor 313 an indication to execute the failure processes that it has decided upon (S25).

When the hypervisor 313 detects the indication from the block control portion 314 (S34) it executes the indicated failure process (S35) and reports to the FOS 311 that failure processing in the hypervisor 313 has been executed (S36). The FOS 311 implements failure processing in accordance with an indication from the block control portion 314 (S37).

It may also be decided in S24 in the present embodiment that failover will be performed. For example, if a failure occurs in the NIC 36 without an alternative path configuration being available, it is also possible to adopt the flow in FIG. 11 instead of the flow in FIG. 10. In this case, although the failure is in fact in the NIC 36, the hypervisor 313 reports the details to the block control portion 314 as if the failure had occurred in the FOS 311 which it itself manages (S31, S32). The hypervisor 313 may also report the failure of the NIC 36 at the same time that it communicates to the block control portion 314 the occurrence of the failure in the FOS 311.

When the block control portion 314 finds the occurrence of the failure in the FOS 311 (S23: YES) it decides that a failover process will be implemented (S24), and it creates an indication including information regarding for example the failover destination and records it in the shared memory area 3226 (S25).

When the hypervisor 313 detects the indication from the block control portion 314 (S32: YES) it executes failure processes in accordance with the indication (S35). Further, the hypervisor 313 reports the indication from the block control portion 314 via the shared memory area 3225 to the FOS 311 which uses the NIC 36 that has failed (S36). When the FOS 311 detects the indication from the block control portion 314 it executes a failover process in accordance with the indication (S37).

FIG. 12 is a flowchart illustrating the operation when a failure has occurred in hardware managed by the block control portion 314.

When the failure monitoring portion 43 detects a hardware failure it communicates to the FOS 311, the hypervisor 313 and the block control portion 314 that a failure has occurred, by storing the failure information in prescribed memory areas (S11 to S13).

Because the FOS 311 does not itself manage the hardware that has failed (S14: NO), it waits (S30). Because the hypervisor 313 does not itself manage the hardware that has failed (S15: NO), it also waits (S40). Processes that are underway will be discussed hereinafter. It should be noted that when waiting, the FOS 311 also accepts new I/O requests.

When the block control portion 314 receives the failure report and determines that a failure has occurred in hardware that it manages (S16: YES), it decides upon specific processing content for the failure taking into account all of the failures that are occurring in the storage system 30 (S41). From among the failure processes that it has decided upon, the block control portion 314 implements the failure processes that are to be executed by the block control portion 314 (S42).

The block control portion 314 records in the failure information storage area of the memory area 3226 which it shares with the hypervisor 313 the failure report and the failure process indication (S43). The hypervisor 313 monitors the shared memory area 3226 and detects the failure report and the failure process indication (S34: YES). The hypervisor 313 implements the processes which are to be executed by the hypervisor 313, from among the failure processes indicated by the block control portion 314 (S35). The hypervisor 313 reports the failure process indication to the FOS 311 by storing it in the failure information storage area of the memory area 3225 which it shares with the FOS 311 (S36).

The FOS 311 monitors the shared memory area 3225, detects the indication from the block control portion 314 and executes failure processes in accordance with the indication (S37).

It should be noted that depending on the condition of the failure, there may be no failure processes to be executed by the hypervisor 313 or the FOS 311.

Consider for example a case in which an area used by the block control portion 314 is allocated to the memory 32, in which a failure has occurred. Where necessary, the block control portion 314, in which high reliability is demanded, redundantly manages identical information in a plurality of different memory areas. If a failure occurs in one of two memory areas, the block control portion 314 executes as a failure process a program allowing it to continue processing using only the other memory area. If neither the hypervisor 313 nor the FOS 311 use the failed memory then neither the hypervisor 313 nor the FOS 311 will have any processes to execute in relation to the failed memory.

Another example will now be considered. If for example the disk device 34 fails, the block control portion 314 manages the disk device 34 and therefore the failure process relating to the failed disk (a shut-down process or the like) is executed by the block control portion 314.

Suppose for example that a plurality of disk devices 34 belonging to the same RAID group each fail within a short period of time. If restoration of the data stored in the disk device that failed first is not completed before a failure occurs in another disk device within the same RAID group, and data cannot be read, a so-called double failure results. In the case of a RAID group having a RAID 5 configuration, if a double failure occurs it is not possible to restore data stored on the failed disk device.

If a file system is stored on a logical volume (LU) created from a RAID group in which a double failure has occurred, the block control portion 314 reports to the FOS 311 the number of the logical volume which has failed. The FOS 311 executes a partial shutdown process and causes only the file system stored on the logical volume which has failed to go offline.

It should be noted that if after the FOS 311 has handed over an I/O process to the block control portion 314 the block control portion 314 returns an 'I/O error' to the FOS 311, the FOS 311 can recognize a failure of the disk device 34.

It should be noted that in the abovementioned example the block control portion 314 decides upon the failure processes, but the hypervisor 313 may instead decide upon the failure processes to be performed in the FOS 311.

Using FIG. 13, a description will now be given of another example of the operation when a failure has occurred in hardware managed by the FOS.

A description was given using FIG. 10 of a case in which, when a failure has occurred in hardware managed by the FOS 311, communication that the failure has occurred is effected by storing failure information in failure information storage areas within memory areas corresponding respectively to the FOS 311, the hypervisor 313 and the block control portion 314.

Alternatively, the failure information may be stored in the memory area 3223 of the hypervisor 313 and the memory area 3214 of the block control portion 314, without the failure information being stored in the memory area 3221 of the FOS 311, and the failure occurrence may be communicated from the hypervisor 313 to the FOS 311.

If a failure has occurred in hardware used by the FOS 311, a detailed report of the failure, for example specifying the location in which the failure occurred, may be created by the hypervisor 313 which manages the FOS 311, or it may be created by the FOS 311.

FIG. 13 illustrates, for a case in which a failure has occurred in hardware used by the FOS 311, a case in which the failure information is first communicated only to the hypervisor 313 and the block control portion 314, and in response to a communication from the hypervisor 313 the FOS 311 creates a detailed report of the failure and sends it via the hypervisor 313 to the block control portion 314.

When the failure monitoring portion 43 detects that a failure has occurred in hardware used by the FOS 311 it stores in the memory area 3223 used by the hypervisor 313 and the memory area 3224 used by the block control portion 314 failure information indicating that the failure has occurred (S12, S13). The failure information is not stored in the memory area 3221 used by the FOS 311.

When the hypervisor 313 detects the failure information it communicates the occurrence of the failure to the FOS 311 which uses the failed hardware by storing the failure information in the memory area 3225 which it shares with the FOS 311 (S50). The hypervisor 313 determines that it is not a failure of hardware that it manages (S15: NO), and it waits (S20).

Similarly, when the block control portion 314 detects the failure information it determines that it is not a failure of hardware that it manages (S16: NO), and it waits (S21).

Upon acquiring the failure information (S51) the FOS 311 determines that the failure has occurred in hardware for which it is responsible (S14: YES), and it executes steps S17 to S19 as discussed in FIG. 1. It should be noted that if the contents of the failure process include a failover process, this is implemented using a method discussed hereinafter.

As described in FIG. 13, the destinations to which the failure monitoring portion 43 reports the occurrence of failures may be managed separately for each piece of hardware. By reporting the occurrence of a failure only to the OS which needs to receive the failure report, from among the FOS 311, the hypervisor 313 and the block control portion 314, the communication load within the storage system 30 can be alleviated.

A description will be given using FIG. 14 of an example of a failure management table T13 which can be used to manage the destinations to which the occurrence of failures in each hardware resource are reported.

The failure management table T13 is stored for example in an area retained within the memory 321. A failure management table T13 is prepared for each hardware resource. FIG. 14 illustrates a failure management table for processors T130 and a failure management table for memory T131. Illustrations of a table for port management and a table for disk device management are omitted.

The failure management table for processors T130 maps and manages for example the resource name, the state and the user. A name which uniquely specifies the CPU 31 within the storage system is stored in 'Resource name'. The usage state (for example Normal, In use, Shut down) of the CPU 31 specified by the resource name is stored in 'State'. The OS (FOS, hypervisor, block control portion) which uses the CPU 31 specified by the resource name is stored in 'User'.

The failure management table for memory T131 maps and manages for example the resource name, the state, the address and the user. A name which uniquely specifies the memory 32 within the storage system is stored in 'Resource name'. The usage state (for example Normal, In use, Shut down) of the memory 32 specified by the resource name is stored in 'State'. The memory area set up in the memory space of the memory 32 specified by the resource name is stored in 'Address'. The user of each memory area (the FOS, the hypervisor, the block control portion, or shared by the FOS and the hypervisor, shared by the hypervisor and the block control portion) is stored in 'User'.

If the failure monitoring portion 43 detects a failure, it confirms using the management table T13 the user of the hardware in which the failure has occurred, and reports the occurrence of the failure to the user.

Here, if the disk device 34 is used by both the block control portion 314 and the OSs other than the block control portion 314 (the hypervisor 313, the FOS 311), then the disk device 34 is a hardware resource shared by all of the OSs. If a failure has occurred in the disk device 34 then it is difficult to specify which of the OSs (the FOS, the hypervisor, the block control portion) the block data stored in the failed disk device is used by. Therefore if a failure has occurred in a disk device 34 shared by all of the OSs, the occurrence of the failure is reported to all of the OSs.

In the case of memory 32, the failure monitoring portion 43 determines for each single physical piece of memory whether it is operating normally or has failed. If the memory space in a single physical piece of memory 32 is divided and used by a plurality of users (the FOS, the hypervisor, the block control portion, shared), then when a failure occurs in that piece of memory 32 the occurrence of the failure is reported to all users.

Here, failures occurring in the CPU 31, the memory 32, the disk device 34 and the like can be detected by means of failure monitoring portions 43 which are provided in these piece of hardware as hardware circuits. In contrast, the HBA ports and the NIC 36 ports cannot detect their own failures. Therefore failure detecting programs or the like are used to detect failures of the ports by confirming at fixed intervals whether they are operating normally.

If a failure occurs in a hardware resource used by any one FOS 311 of a plurality of FOSs operating on the hypervisor 313, and failover of that FOS 311 is required, then the hypervisor 313 which manages the FOS 311 communicates the occurrence of the failure to the block control portion 314.

In this way it is possible for the failure detecting and location specifying processes to be dispersed by providing a plurality of failure monitoring portions 43 and setting their respective monitoring targets. Further, by hierarchically managing failures in the FOS, the hypervisor and the block control, management can be simplified and failure information can be consolidated in the block control portion. By means of this configuration it is possible for failure process judgments to be made by the highly reliable block control portion while the cost of failure detection processing and management by the block control portion is reduced.

<Detecting Failures Using Software>

Using FIG. 15 and FIG. 16, a description will now be given of a method for detecting failures that cannot be detected using a failure monitoring portion 43 in the form of a hardware circuit. FIG. 15 illustrates a situation in which the hypervisor 313 constantly monitors the FOS 311 and detects failures of the FOS 311. Without limitation to this, failures can be detected using software processes, for example by the hypervisor 313 and the block control portion 314 monitoring each other, or by the block control portion 314 monitoring the FOS 311 via the hypervisor 313.

As a premise, in order for the FOS 311 to begin a failover process it is necessary for failure of the FOS 311 to be detected. Methods for detecting failures of the FOS 311 include the following two examples.

The first method is a method in which the block control portion 314 detects failures of the FOS 311 via the hypervisor 313. The block control portion 314 detects failures of the FOS 311 based on life or death monitoring executed regularly between the hypervisor 313 and the FOS 311. The first method will be described using FIG. 15 and the like.

The second method is a method in which, if a failure has occurred in hardware used by the FOS 311, the FOS 311 receives an interrupt signal issued by the hardware, and the FOS 311 reports the occurrence of the failure via the hypervisor 313 to the block control portion 314. The second method will be discussed later using FIG. 19.

FIG. 15 and FIG. 16 are flowcharts illustrating a process whereby the block control portion 314 monitors failures of the FOS 311 via the hypervisor 313. Here, for ease of understanding a description is given by way of example of a case in which a failure has occurred in the FOS 311A in the cluster 50A.

The FOS 311A performs heartbeat communication with the FOS 311B, which is a counterpart with which it forms a pair, and by this means it monitors whether the counterpart FOS is operating normally. In the present embodiment a life or death confirmation process is also executed regularly between the FOS 311A and the hypervisor 313A. Further, in the present embodiment a life or death confirmation process can also be executed regularly between the hypervisor 313A and the block control portion 314A, but this is omitted from the flowchart.

For example, an area dedicated to life or death confirmation that can be accessed by the hypervisor 313A is prepared in the memory area 3221A used by the FOS 311A. The hypervisor 313A sets information for life or death confirmation in the life or death confirmation area (S61). For example, the hypervisor 313A sets to 1 a prescribed bit for life or death confirmation stored in the area for life or death confirmation. The prescribed bit may be called a life or death confirmation bit.

The FOS 311A regularly monitors the area for life or death confirmation, and if the prescribed bit has been set to 1 it resets the prescribed bit, setting it to 0 (S62).

As discussed above, the hypervisor 313A regularly sets the prescribed bit to 1, but prior to this it confirms the value of the prescribed bit (S63). The hypervisor 313A determines whether the prescribed bit is set to 1 (S64). If the prescribed bit has been set to 0 (S64: NO), the FOS 311A is operating normally. Accordingly, the hypervisor 313A sets the prescribed bit to 1 (S61).

In contrast, if when the hypervisor 313A confirms the value of the prescribed bit the prescribed bit is still set to 1 (S64: YES), it can be determined that an error has occurred in the FOS 311A and that it is thus unable to reset the prescribed bit.

Accordingly, the hypervisor 313A stores in a failure information storage area in the memory area 3226A shared by the hypervisor 313A and the block control portion 314A information (FOS failure information) indicating that a failure has occurred in the FOS 311A (S65).

The block control portion 314A regularly monitors the shared memory area 3226A (S66) and detects that a failure has occurred (S67: YES). When the block control portion 314A recognizes a failure of the FOS 311A (S68) it issues a reset indication to the hypervisor 313A to cause it to reset the failed FOS 311A (S69). By storing the reset indication in the shared memory area 3226A the block control portion 314A transmits to the hypervisor 313A the fact that the reset indication has been issued.

When the hypervisor 313A has acquired the reset indication from the block control portion 314A it issues a reset request to the FOS 311A in which the failure occurred (S70).

When the FOS 311A receives the reset request issued by the hypervisor 313A (S71) it returns a response to the hypervisor 313A notifying it of reset completion (S72), after which it executes a reset process (S73).

When the hypervisor 313A receives the reset response from the failed FOS 311A (S74) it transmits the reset response via the shared memory area 3226A to the block control portion 314A (S75).

When the block control portion 314A receives the reset response from the failed FOS 311A via the hypervisor 313A it confirms that the failed FOS 311A has been reset and confirms that preparations for a failover process have been completed (S75).

In order to communicate to the failover destination FOS 311B that an error has occurred in the failover origin FOS 311A, the block control portion 314A stores the failure information relating to the failed FOS 311A in the memory area 3224 used by the block control portion 314B (S76).

The block control portion 314A may write the failure information to the disk device 34 instead of to the memory area 3224. The block control portion 314A may execute step S76 at the time point in step S68 at which it recognizes the failure of the FOS 311A. In other words, it may transmit the presence of the failed FOS 311A to the block control portion 314B in the other cluster 50B before confirming the reset response from the failed FOS 311A. By this means it is possible to begin the failover process at an earlier stage, and the switching time can be reduced.

The explanation now moves to FIG. 16. FIG. 16 illustrates the operation in cluster 50B. By referring to the memory area 3224 (S77) the block control portion 314B recognizes that a failure has occurred in the FOS 311A (S78). The block control portion 314B indicates to the hypervisor 313B that it should request the FOS 311B to execute a failover process (S79). The failover destination FOS 311B is decided in advance between the clusters.

In accordance with the indication from the block control portion 314B, the hypervisor 313B indicates to the failover destination FOS 311B that it should begin the failover process (S80). When the FOS 311B receives the indication from the hypervisor 313B (S81) it begins the failover process in order for it to perform processing in place of the failed FOS 311A (S81).

The FOS 311B recognizes the logical volume (LU) for which the failed FOS 311A was responsible (S83) and mounts that logical volume (S84). The FOS 311B thereafter accepts file commands relating to the mounted logical volume from the command issuing apparatus 101B and processes them.

The LU management information T10 (FIG. 5) relating to the logical volume for which the failed FOS 311A was responsible is handed over to the failover destination FOS 311B when the failover process is executed.

The failover destination FOS 311B executes both command processes relating to logical volumes for which it was originally responsible, and command processes relating to the logical volume which it took over from the failed FOS 311A.

A description will now be given of the handover of information between the clusters that is effected in order for failover to be performed. When issuing a normal I/O request, a user specifies for example the file (file system) name or directory information. As illustrated in the example in FIG. 22, the FOS manages information T33 which indicates the correlation between information specified by the user and the LU number managed by the FOS. Meanwhile the block control side manages information T14 indicating the correlation between the LU number recognized by the FOS and the logical device number managed internally by the block control. The relationship between the number of corresponding LUs and the number of block control logical device numbers may be 1 to 1 or it may be 1 to N.

The information T33 and the information T14 are respectively stored in either 3211 or 3212, and 3214, within the memory 32. Alternatively, the information T33 and the information T14 may be stored on the disk device 34 and stored in the memory 32 prior to use. When the failover process begins, the information T33 from the FOS in which the failure occurred is stored in the shared memory 3216 or 3417. The information is then transmitted to the target FOS by the block control. Specifically, the block control stores the T33 of the FOS in which the failure has occurred in 3216 or 3217 of the block control cluster and the FOS which has taken over.

As a different method, a shared LU for the FOSs may be provided. The block control portion creates an LU from a storage area of the disk device 34 and offers it to an external apparatus. With regard to a particular LU, it is offered simultaneously to two FOSs comprising a failover pair as an LU having the same identifier. Specifically, referencing is enabled after the LU has been allocated to two FOSs and has been created in both FOSs. In the shared LU, T33A and T33B are stored respectively in the FOS of the cluster 50A and the FOS of the cluster 50B. Then, if for example the FOS in 50B fails, T33B is read out in step S82 when failover of the FOS in 50A is performed, and the processes of the FOS in 50B are handed over.

The shared LU is for example not a file system but a device file, and is an area that can be read without being mounted. Configuration information such as LU information for which each FOS is responsible is stored in the shared LU, and normally an FOS only refers to the LU information for which it is itself responsible. On the other hand, when failover occurs, by making it possible to refer to the LU information for which the counterpart is responsible, it is possible to take over performance of the counterpart's processes. Exclusive access control can also be effected by performing lock management during writing only.

In FIG. 15 and FIG. 16, the block control portion 311A responsible for the cluster 50A to which the failed FOS 311A belongs provides the hypervisor 313B with the failover indication via the block control portion 311B responsible for the cluster 50B to which the failover destination FOS 311B belongs. The configuration may alternatively be such that the block control portion 311A responsible for the cluster 50A to which the failed FOS 311A belongs provides the indication directly to the hypervisor 313B of the cluster 50B to which the failover destination FOS 311B belongs.

For example, the configuration may be such that indications are sent from the block control portion 311A to the hypervisor 313B by preparing a memory area for transmitting information from the block control portion 311A to the hypervisor 313B, and recording in this memory area information relating to the failover.

Instead of a method in which a life or death confirmation bit is set or reset, the configuration may be such that the FOS 311 and the hypervisor 313 perform heartbeat communication. Further, the configuration may be such that the block control portion 314 monitors the life or death of the FOS 311 without going via the hypervisor 313.

The reset indication from the hypervisor 313A to the failed FOS 311A may be performed at the time point (S65) at which the hypervisor 313A confirms the failure of the FOS 311A. In other words, the hypervisor 313A does not need to obtain a reset indication from the block control portion 314A, and can send a reset indication to the failed FOS 311A immediately following step S65. In FIG. 15, step S69 is omitted.

Then, when the hypervisor 313A receives the reset response from the failed FOS 311A (S74) it reports to the block control portion.

FIG. 17 illustrates in detail the operation of the block control portion 314 which extends across the clusters, from among the operations discussed in FIG. 14 and FIG. 15.

If a failure occurs in the FOS 311A of cluster 50A (S100), the FOS 311A stores in the memory area 3225A shared by the FOS 311A and the hypervisor 313A FOS failure information indicating that a failure has occurred in the FOS 311A (S101).

When the hypervisor 313A detects the failure of the FOS 311A (S102) it stores the FOS failure information in the memory area 3226A shared by the hypervisor 313A and the block control portion 314A (S103). It should be noted that if the hypervisor 313A has first detected the failure of the FOS 311A then it begins from step S103, without steps S100 to S102 being performed.

The block control portion 314A detects the failure of the FOS 311A by referring to the memory area 3226A which it shares with the hypervisor 313A (S104). Using a so-called dual-writing function, the block control portion 314A writes the FOS failure information into the memory area 3224A possessed exclusively by the block control portion 314A and the memory area 3224B possessed exclusively by the block control portion 314B (S106, S107). Because the FOS failure information is managed in duplicate by the cluster 50A and the cluster 50B, loss of the FOS failure information can be prevented. Dual-writing is discussed in FIG. 18 hereinafter.

The explanation now moves to the processes in cluster 50B. The block control portion 314B of the cluster 50B recognizes the failure of the FOS 311A by referring to the memory area 3224B (S108). The block control portion 314B stores the FOS failure information in the memory area 3226B which it shares with the hypervisor 313B (S109).

When the hypervisor 313B detects the failure of the FOS 311A by referring to the shared memory area 3226B (S110), it indicates to the FOS 311B which forms a failover pair with the failed FOS 311A that it should begin the failover process (S111). In accordance with the indication from the hypervisor 313B the FOS 311B executes the failover process (S112).

The write process in which the FOS failure information is written to the memory area 322B (S107) as a result of the dual-writing in step S105, and the read process in which the FOS failure information is read from the memory area 3224B (S108) take the form of a program in which they are processed as a set.

When the write process program operates in one of the clusters 50A the read process program in the counterpart cluster 50B is activated. A plurality of write process programs and read process programs can operate in each cluster respectively, and the fastest program performs the process. For example, from among a plurality of read process programs, the read process program that first discovers that the FOS failure information has been stored in the memory area 3224B reads the FOS failure information from the memory area 3224B.

It should be noted that instead of performing dual-write processing whereby the FOS failure information is written simultaneously to a plurality of memories 3224A and 3224B, the configuration may be such that the FOS failure information is transmitted to the counterpart cluster using an inter-memory communication function.

In other words, the block control portion 314A writes the FOS failure information only to the memory 3224A. The FOS failure information in the memory 3224A is then forwarded to the memory 3224B using inter-memory communication, and the contents stored in both memories are synchronized.

Information specifying the FOS to be indicated when the abovementioned failover is indicated is stored in advance in the shared memory 3215 as failover configuration information T50, as illustrated in FIG. 21. The failover configuration information T50 is information which, for each cluster, is used to manage the FOSs belonging to the cluster. Specifically, an identifier which identifies a cluster is mapped to an identifier for uniquely identifying the FOS at least within the cluster to which it belongs. Thus if a failure occurs in any FOS, another FOS belonging to the same cluster can be selected as a failover destination. It should be noted that in addition to the cluster identifier and the FOS identifier, the failover configuration information T50 may also manage the failover state. The failover state includes for example 'failover process underway', 'failover process completed', and 'not performing failover process'.

The dual-write function will be described with reference to FIG. 18. FIG. 18(a) illustrates a case in which a CPU 31 possessed exclusively by the block control portion 314 writes failure information to a memory 3224A which it uses and to a memory 3224B used by a counterpart CPU. The CPU used by the block control portion 314A in one of the clusters 50A is referred to as CPU 31CA, and the CPU used by the block control portion 314B in the other cluster 50B is referred to as CPU 31CB.

The CPU 31CA writes the failure information to a failure information storage area in memory 3224A which it uses itself, and also writes the failure information to another memory 3224B via the other CPU 31CB.

FIG. 18(b) illustrates a case in which cache memories 39 in controller boards 41 are provided with a dedicated circuit. A cache memory 39A in one of the clusters 50A and a cache memory 39B in the other cluster 50B are each provided with a data transfer circuit. The data transfer circuits are configured as ASICs (Application Specific Integrated Circuits), and are dedicated circuits for writing failure information to memory.

In the case in FIG. 18(b), the data transfer circuits perform processes in place of the CPUs 31, copying the failure information from the cache memory and writing it to the copy origin memory 3224A and the copy destination memory 3224B.

It should be noted that the configuration may also be such that the failure information is forwarded to and stored in the management apparatus 20. In this case the failure information is retained in three places, namely the clusters 50A, 50B and the management apparatus 20, and thus even if any one set of failure information is lost, the failure information can still be managed in duplicate.

According to the present embodiment configured in this way, information relating to failures in the storage system 30 can be managed using a block control portion 314 which is provided extending across the clusters 50A, 50B and which is responsible for reading and writing data from/to the disk device 34. Therefore failures in the storage system 30 can be managed at low cost without the need for a failure-monitoring apparatus to be specially provided externally.

In the present embodiment information relating to failures within the storage system 30 is consolidated in the block control portion 314 which is provided extending across both clusters 50A, 50B and which is capable of recognizing the condition of the FOSs 311 within both clusters. It is therefore possible to judge whether or not an FOS is in a split-brain state, and failover can be performed reliably. As discussed hereinabove, management is simplified by performing hierarchical failure management. Moreover, in particular because the exchange of information between clusters is performed via the block control, the block control portion, which has the highest reliability, can without fail detect failure information at an early stage, improving system reliability, and it is not necessary for example to adjust for discrepancies in the timing with which failures are detected.

In the present embodiment the block control portion 314 operates on the same piece of hardware or on hardware coupled by means of an internal bus 42, and therefore failure management can be performed more rapidly and with higher reliability than with a conventional heartbeat cable that links FOSs.

Embodiment 2

A second embodiment will be described using FIG. 19. Each of the following embodiments, including the present embodiment, correspond to variations of the first embodiment. The description in the following embodiment focuses on differences from the first embodiment. In the present embodiment the FOS 311 detects failures of itself and reports to the block control portion 314.

FIG. 19 is a flowchart illustrating an example of a method of managing failures. For convenience of explanation it is assumed that a failure has occurred in an FOS 311A of a cluster 50A.

The FOS 311A detects by means of an interrupt signal from a failure monitoring portion 43A that a failure has occurred in hardware used by the FOS 311A (S120). The FOS 311A stores failure information in a failure information storage area in the memory area 3221A (FIG. 4) which it possesses exclusively (S121). The FOS 311A reports the occurrence of the failure to the hypervisor 313A by writing the failure information to the memory area 3225A which it shares with the hypervisor 313A (S122).

When the hypervisor 313A detects the failure information (S124: YES) by referring to the shared memory area 3225A (S123), it recognizes that a failure has occurred in the FOS 311A (S125). The configuration may also be such that the hypervisor 313A refers to the shared memory area 3225A in response to a confirmation request from the FOS 311. The hypervisor 313A which has confirmed the failure of the FOS 311A stores the failure information in the memory area 3226A which it shares with the block control portion 314A.

The block control portion 314A regularly monitors the memory area 3226A which it shares with the hypervisor 313A (S126) and detects the failure information (S67: YES).

When the block control portion 314A detects the failure of the FOS 311A (S68) it provides the hypervisor 313A with a reset indication to cause a reset request to be sent from the hypervisor 313A to the failed FOS 311A (S69). Other steps S70 to S76 are discussed in FIG. 15, and so an explanation thereof is omitted. The present embodiment accomplishes similar effects to the first embodiment.

Embodiment 3

A third embodiment will be described using FIG. 20. In the present embodiment an explanation is provided of a method of processing I/O requests while a failover process is being performed.

When the storage system 30 receives an I/O request from a command issuing apparatus 101 (read command, write command) it activates a command control program P10 and executes the requested process. This is called normal processing.

If a failure has occurred, a program for processing control commands during failure recovery P15 that is separate from the command control processing program P10 is activated, and an I/O command failure recovery process is executed. In other words, the program that operates differs depending on whether or not there is a failure.

The present embodiment recognizes that a failure has occurred by running a program to check whether or not a failure has occurred at a particular time during normal operation, and switches over to the command control processing during failure recovery shown on the right side of FIG. 20.

The checking program is set to run with timings S132, S134 at a plurality of points during the sequence of I/O processes. Specifically, a hardware failure check is performed for each process during normal processing.

When in step S131 the command control program has for example performed a process to convert an address and store the result of the address conversion to the memory, in step S132 it checks whether or not a failure has occurred. If the command control program judges that there is an error, for example if it has been unable to write to memory and an error has been returned (S132: YES), it proceeds to S135.

If there is no failure (S132: NO) the command control program proceeds to step S133 and the next step in the command control is processed. In S133 the command control program performs a process to store data in a cache. If for example it cannot store to the cache and it judges that there is a failure (S134: YES), it proceeds to step S135.

Although this is not illustrated in the drawings, at each step in a write process executed between steps S132 and S133 a check is performed to confirm whether processing has been performed normally, and if there is a failure the process transitions to S135. For example, when referring to configuration information the check confirms whether the logical device on which the configuration information is stored is shut down. The failure check is performed by the entity performing the related processes, and this may be the FOS or the block control for example.

In S135 the failure information is reported to the failure monitoring portion. The way in which the report is sent to the failure monitoring portion, and subsequent processes are described in FIGS. 10 to 12. When failure processing has been performed in FIGS. 10 to 12, the command control processing during failure recovery is activated, and reference is made to the configuration information to detect whether or not any I/Os were underway when the failure occurred (S136). When a normal I/O process begins, information specifying which CPU is to execute which process (for example read, write) with respect to which logical device is recorded as configuration information in the control memory, the logical device or the like.

If a hardware failure is detected by means of an interrupt coming from the hardware itself, the failure is first reported in FIGS. 10 to 12, after which interrupts go to I/Os that are underway, in other words interrupts go to the command control program. The existence of the failure is then reported (S135), and the process switches over to the failure recovery program.

Further, if for example a CPU is reset as a result of a failure, all processing is temporarily halted, a reboot occurs, and then the process switches over to the failure recovery program.

The failure recovery program P15 decides upon the failure recovery strategy based on the abovementioned tracking information. One strategy is to do nothing and terminate the process (S131). In this case the I/O process is not completed. The command issuing apparatus 101A or 101B cannot receive a response from the storage system 30 within a prescribed time period, and timeout occurs. The command issuing apparatus 101A or 101B then once again issues an I/O request to the storage system 30. Failure processing is implemented at the time point at which the I/O request is reissued, and if failure recovery has been effected, the I/O request is processed normally.

Another strategy is to complete the I/O process (S133). In other words, after executing failure processing such as shutting down the failed location, processing of the I/O request continues.

In order to continue accepting I/O requests, the storage system 30 may if a failure has already occurred switch over to the failure recovery program P15 immediately and terminate I/O processes without their having been completed. It should be noted that the decision as to whether to execute normal processing or failure recovery processing may be made separately for each core in a CPU. Further, identifiers may be assigned to each I/O request, and tracking information may be recorded in memory indicating which of the processes in the sequence of I/O processes each I/O request has completed.

It should be noted that the present invention is not restricted to the embodiments discussed hereinabove. Various additions and modifications can be performed within the scope of the present invention by one skilled in the art.

For example, an FOS can detect the life or death of a hypervisor by means of heartbeat communication with the hypervisor. In the case of the method of setting or resetting bits to confirm the life or death of an FOS as explained in FIG. 15, it is not possible for the bit to be set if a failure occurs in the hypervisor. Accordingly the FOS resets the bit after confirming that it has been set. Thus if the bit has not been set, the FOS can judge that a failure has occurred in the hypervisor.

In the abovementioned embodiments an explanation was given of a case in which the FOS executes a reset process in response to an indication from the hypervisor, but the FOS may execute the reset process by itself. For example if a pair of FOSs forming a failover pair are coupled using a reset cable, and either of the FOSs is autonomously reset, the fact that it has been reset is notified to the counterpart FOS via the reset cable. The counterpart FOS waits for a failover indication from the hypervisor in its own cluster, and if it cannot receive a failover indication from the hypervisor within a predefined time period it notifies the hypervisor that it has received a signal indicating that the counterpart FOS has been reset. The hypervisor which has received this notification transmits it to the block control portion. The block control portion decides to execute a failover process and transmits a failover indication via the hypervisor to the FOS.

Life or death monitoring of the block control portion and the hypervisor can also be performed in the same way as the life or death monitoring between the FOS and the hypervisor. Further, various features and viewpoints discussed in the present embodiments may be suitably combined.

REFERENCE SIGNS LIST

30 Storage system
31A, 31B CPU (control processor)
32A, 32B Memory
33A, 33B Disk interface
34 Disk device
35A, 35B HBA
36A, 36B NIC
41A, 41B Controller board
43A, 43B Failure monitoring portion
50A, 50B Cluster
101A, 101B Command issuing apparatus

The invention claimed is:

1. A storage system configured to process file access requests and block access requests, comprising:
   a plurality of disk devices;
   a plurality of hardware resources including a plurality of processors;
   a plurality of failure detecting portions configured to detect failures,
   a first control portion which is configured to control the block access requests to a to the disk devices;
   a plurality of virtualization control portions which are configured to manage a plurality of virtual machines, the processors executing the virtualization control portions which manage the virtual machines;
   a plurality of second control portions which are configured to process the file access requests, and operate on the virtual machines managed by the virtualization control portions;
   wherein a failure information management portion is provided in the first control portion and is configured to consolidate and manage failure information relating to a plurality of failures detected by the failure detecting portions,
   wherein a failure recovery portion is provided in the first control portion and is configured to decide on a processing content for processing of the failures managed by the failure information management portion and to send an indication that the processing content that has been decided upon should be executed by a control portion selected from among the first control portion, the second control portions and the virtualization control portions that is responsible for a location in which one of the failures occurred,
   wherein, from among a first resource section and a second resource section obtained by logically dividing the hardware resources, the first resource section is created preferentially to the second resource section and is allocated to the first control portion, and the second resource section is distributed via the virtualization control portion to the plurality of second control portions.

2. The storage system according to claim 1, wherein the hardware resources are divided into a first cluster and a second cluster, and
   wherein a first part of the first control portion is included within the first cluster and is configured to process the block access requests within the first cluster, a second part of the first control portion is included within the second cluster and is configured to process the block access requests within the second cluster, and a coupling portion configured to couple the first part of the first control portion within the first cluster and the second part of the first control portion within the second cluster.

3. The storage system according to claim 2, wherein the hardware resources further include:
   a first shared memory shared by the first control portion and the virtualization control portion, and
   a second shared memory shared by the virtualization control portion and the plurality of second control portions, and
   wherein the failure information is sent to the failure information management portion via the first shared memory or via the first shared memory and the second shared memory.

4. The storage system according to claim 3, wherein the hardware resources include a first dedicated memory area for the first control portion within the first cluster and a second dedicated memory area for the first control portion within the second cluster,
   wherein the first part of the first control portion within the first cluster is configured to dual-write first failure information relating to a first failure generated within the first cluster to the first dedicated memory area and to the second dedicated memory area to report the first failure information to the second part of the first control portion within the second cluster, and
   wherein the second part of the first control portion within the second cluster is configured to dual-write second failure information relating to a second failure generated within the second cluster to the second dedicated memory area and the first dedicated memory area to report the second failure information to the first part of the first control portion within the first cluster.

5. The storage system according to claim 4, wherein the failure detecting portions include a plurality of hardware failure detecting portions configured to detect the failures which are generated in the hardware resources allocated respectively to the first control portion, the second control portions and the virtualization control portions, and a plurality of software failure detecting portions configured to detect the failures which are generated in at least the plurality of second control portions.

6. The storage system according to claim 5, wherein the hardware failure detecting portions are configured to, when detecting the failures relating to the hardware resources which are distributed to the plurality of second control portions, send a communication of the failures to the virtualization control portions, and
   wherein the virtualization control portions are configured to, when receiving the communication from the hardware failure detecting portions, report to the second control portions in which the failures have occurred, from among the plurality of second control portions, that the failures have been detected.

7. The storage system according to claim 6, wherein the disk devices are managed as a shared volume which is shared by the second control portions within the first cluster and the second control portions within the second cluster,
   wherein configuration information managed by each of the second control portions is stored in the shared volume, and
   wherein, during a normal operation, each of the second control portions refers only to the configuration information for which each of the second control portions is responsible, and, during a failover, each of the second control portions further refers to the configuration information for which a counterpart second control portion with which each of the second control portions forms a failover pair is responsible.

8. The storage system according to claim 7, wherein the first cluster and the second cluster are each provided with:
   a first communication control portion that communicates with a first host apparatus to receive the block access requests,
   a second communication control portion that communicates with a second host apparatus to receive the file access requests, and
   a disk interface portion for reading and writing data from/to the disk devices,
   wherein the processors and storage media in each of the first cluster and the second cluster are coupled to communicate with the first communication control portion, the second communication control portion, and the disk interface portion thereof,
   wherein the failure detecting portions are configured to monitor the failures relating to each of the first and second communication control portions, the disk interface portion, the storage media and the processors, and
   wherein the processors are coupled by the coupling portion which is an internal directly-coupled bus.

9. A failure management method for a storage system configured to process file access requests and block access requests, the method comprising:
   providing a plurality of disk devices;
   providing a plurality of hardware resources including a plurality of processors;
   executing a plurality of failure detecting portions which are configured to detect failures;
   executing a first control portion which is configured to control the block access requests to the disk devices;
   executing a plurality of virtualization control portions which are configured to manage a plurality of virtual machines, the processors executing the virtualization control portions which manage the virtual machines;
   executing a plurality of second control portions which are configured to process the file access requests, and the second control portions operate on the virtual machines;
   executing a failure information management portion in the first control portion which is configured to consolidate and manage failure information relating to a plurality of failures detected by the failure detecting portions; and
   executing a failure recovery portion in the first control portion which is configured to decide on a processing content for processing of the failures managed by the failure information management portion and send an indication that the processing content that has been decided upon should be executed by a control portion selected from among the first control portion, the second control portions and the virtualization control portions that is responsible for a location in which one of the failures occurred,
   wherein, from among a first resource section and a second resource section obtained by logically dividing the hardware resources, the first resource section is created preferentially to the second resource section and is allocated to the first control portion, and the second resource section is distributed via the virtualization control portion to the plurality of second control portions.

* * * * *